(12) United States Patent
Hiroi

(10) Patent No.: US 10,718,948 B2
(45) Date of Patent: Jul. 21, 2020

(54) HEAD-MOUNTED DISPLAY APPARATUS, DISPLAY CONTROL METHOD, AND COMPUTER PROGRAM

(71) Applicant: SEIKO EPSON CORPORATION, Tokyo (JP)

(72) Inventor: Yoshiaki Hiroi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/174,696

(22) Filed: Oct. 30, 2018

(65) Prior Publication Data

US 2019/0146222 A1 May 16, 2019

(30) Foreign Application Priority Data

Oct. 31, 2017 (JP) .................. 2017-210263

(51) Int. Cl.
*G09G 5/00* (2006.01)
*G06F 3/033* (2013.01)
*G09G 5/08* (2006.01)
*G02B 27/01* (2006.01)
*G06F 3/01* (2006.01)
*G06F 3/0354* (2013.01)

(52) U.S. Cl.
CPC ......... *G02B 27/0172* (2013.01); *G06F 3/012* (2013.01); *G06F 3/03547* (2013.01); *G02B 2027/014* (2013.01); *G02B 2027/0138* (2013.01); *G02B 2027/0141* (2013.01); *G02B 2027/0178* (2013.01)

(58) Field of Classification Search
CPC .................................. G02B 27/0172
See application file for complete search history.

(56) References Cited

U.S. PATENT DOCUMENTS

| 5,068,645 A * | 11/1991 | Drumm ................... G06F 3/012 340/4.11 |
| 2011/0007035 A1* | 1/2011 | Shai ........................ G06F 3/014 345/179 |
| 2018/0321493 A1* | 11/2018 | Kim ........................ G02B 27/01 |
| 2019/0220040 A1* | 7/2019 | Wu ........................... G06F 3/013 |

FOREIGN PATENT DOCUMENTS

| JP | 2010-231290 A | 10/2010 |
| WO | 2010/110411 A1 | 9/2010 |

* cited by examiner

*Primary Examiner* — Nan-Ying Yang
(74) *Attorney, Agent, or Firm* — Oliff PLC

(57) ABSTRACT

A head-mounted display apparatus including an image display unit configured to display a display object image and a pointer image, a head movement detection unit configured to detect an amount of rotation angle of a head of a user, and a display controller configured to control a display mode of the pointer image, including a movement speed of the pointer image, within a display region of the image display unit. The display controller executes a first display control configured to change the movement speed of the pointer image in accordance with the detected amount of rotation angle so as to display the pointer image.

6 Claims, 22 Drawing Sheets

US 10,718,948 B2

HEAD-MOUNTED DISPLAY APPARATUS, DISPLAY CONTROL METHOD, AND COMPUTER PROGRAM

BACKGROUND

1. Technical Field

The invention relates to a head-mounted display apparatus.

2. Related Art

Head-mounted display apparatuses (head-mounted displays (HMDs)) are known that display an image and the like within the field of view of a user wearing the head-mounted display apparatus on the head. For example, a head-mounted display apparatus uses a liquid crystal display and a light source to generate imaging light, which in turn is guided into the eyes of the user by using a projection optical system, light guiding plates, and the like, allowing the user to recognize a virtual image. The user manipulates a pointer, such as a mouse cursor, displayed on the liquid crystal display to control the head-mounted display apparatus. A controller having a plurality of operation units, such as buttons and a track pad, is used as an input device to control the pointer.

In general, the controller is operated while being held in the user's hand. For example, when the user carries the controller in a pocket while watching a movie for a long period of time or while walking, the user may have to take the controller out of the pocket each time the user intends to operate the controller, which is burdensome for the user. Various techniques have been proposed for controlling a head-mounted display apparatus without holding the controller in hand. JP-A-2010-231290 discloses a technique for utilizing sensors (gyro, acceleration, geomagnetic, optical, and camera) mounted on a head-mounted display apparatus to detect an inclination angle of the head of a user around his/her neck with respect to an axis in the direction of gravitational acceleration in order to operate a device to be operated (radio-controlled device, camera, and the like) based on the detected inclination angle of the user's head.

SUMMARY

However, when the user desires to select a menu in a large display region used in virtual reality (VR) and the like, for example, the user may need to incline the head greatly to move a pointer. Such an action puts a burden onto the neck and the head of the user, sacrificing convenience for the user. Thus, there is a need for a technique that allows a user to control a head-mounted display apparatus without holding an input device in hand, while suppressing a decrease in convenience for the user.

The invention has been made to address at least some of the above-described issues and can be realized as the following embodiments.

(1) According to an exemplary embodiment of the invention, a head-mounted display apparatus is provided. The head-mounted display apparatus includes an image display unit configured to display a display object image and a pointer image; a head movement detection unit configured to detect an amount of rotation angle of a head of a user; and a display controller configured to control a display mode of the pointer image, including a movement speed of the pointer image, within a display region of the image display unit, wherein the display controller executes a first display control configured to change the movement speed of the pointer image in accordance with the detected amount of rotation angle to display the pointer image.

According to the head-mounted display apparatus in this embodiment, the first display control configured to detect the amount of rotation angle of the head of the user and display the pointer image at a movement speed changed in accordance with the detected amount of rotation angle is executed, such that the display mode of the pointer image can be controlled in accordance with the amount of rotation angle of the head. As a result, the user can control the head-mounted display apparatus without holding an input device in hand. Consequently, decrease in convenience for the user can be minimized.

(2) The head-mounted display apparatus of the above-described embodiment may further include an operation detection unit configured to detect a first operation entry representing a predetermined operation entry by the user onto the head-mounted display apparatus, wherein the display controller executes the first display control when the first operation entry is detected.

According to the head-mounted display apparatus in this embodiment, the display controller executes the first display control process when the first operation entry is detected, such that the first display control process can be executed based on the intention of the user. As a result, operation failures are minimized.

(3) The head-mounted display apparatus in the above-described embodiment further includes an operation detection unit configured to detect a first operation entry representing a predetermined operation entry by the user onto the head-mounted display apparatus; and an entry receiving unit configured to receive a second operation entry representing an entry from an input device coupled to the head-mounted display apparatus, wherein the display controller executes the first display control when the first operation entry is detected, and, when the first display control is not executed, executes a second display control configured to control the display mode of the pointer image in accordance with the received second operation entry.

According to the head-mounted display apparatus in this embodiment, the display controller executes the first display control when the first operation entry is detected and, when the first display control is not executed, executes the second display control by which the display mode of the pointer image is controlled in response to the second operation entry being received. This allows the user to selectively control the display mode of the pointer image utilizing the input device or to control the display mode of the pointer image based on the rotation of the head. Consequently, decrease in convenience for the user can be minimized.

(4) According to the head-mounted display apparatus in the above-described embodiment, the display controller may display the pointer image at the center of the display region when the second display control is switched to the first display control.

According to the head-mounted display apparatus in this embodiment, the display controller displays the pointer image at the center of the display region when the second display control is switched to the first display control. This facilitates the user recognizing the pointer image during the first display control.

(5) The head-mounted display apparatus in the above-described embodiment, further includes a position storing unit configured to store a display position of the pointer image when the second display control is switched to the first display control, wherein the display controller may display the pointer image at the stored display position when the first display control is switched to the second display control.

According to the head-mounted display apparatus in this embodiment, the display controller displays the pointer image at the display position of the pointer image upon switching from the stored second display control to the first display control when the first display control is switched to the second display control. This enables the user to readily recognize that switching from the first display control process to the second display control process has taken place. As a result, operation failures are minimized. Furthermore, control of the pointer image during the second display control can be executed again from a state before switching from the second display control to the first display control took place. Consequently, decrease in convenience for the user can be minimized.

(6) In the head-mounted display apparatus according to the embodiment described above, the display controller may display the pointer image by changing at least one of a size, a shape, a pattern, and a color of the pointer image between the first display control and the second display control.

According to the head-mounted display apparatus in this embodiment, the display controller displays the pointer image by changing at least one of the size, the shape, the pattern and the color of the pointer image between the first display control and the second display control. This enables the user to easily recognize which of the first display control and the second display control is being executed. Consequently, decrease in convenience for the user can be minimized.

The invention may be achieved in various embodiments. For example, the invention may be achieved in various embodiments including a display control method for a head-mounted display apparatus, a computer program configured to provide the display control method, and a recording medium storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Exemplary Embodiment

A1. Overall Configuration of Transmission-Type Display Apparatus

Figure 1:
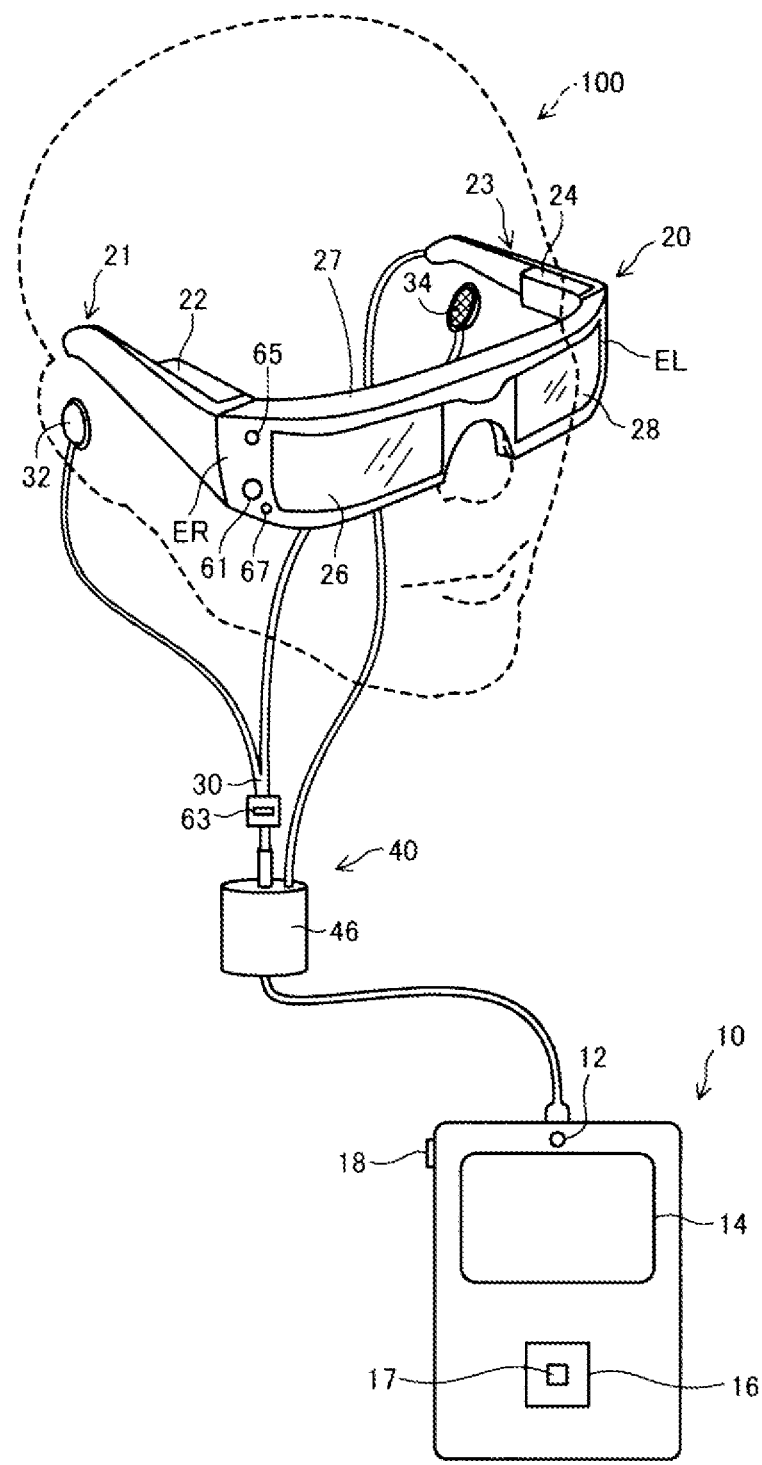
FIG. 1 is an explanatory view illustrating a schematic configuration of a head-mounted display apparatus according to an exemplary embodiment of the invention.

FIG. 1 is an explanatory view illustrating a schematic configuration of a head-mounted display apparatus 100 according to an exemplary embodiment of the invention. The head-mounted display apparatus 100 is a display apparatus to be worn by a user on his/her head and is also referred to as a head-mounted display (HMD). The HMD 100 is a see-through type (transmission type) head-mounted display apparatus that provides an image appearing in an external scene viewed through glasses.

The HMD 100 includes an image display unit 20 configured to allow the user to view an image, and a control device (controller) 10 configured to control the image display unit 20.

The image display unit 20 is a head-mounted body to be worn by the user on the head and has an eyeglasses-like shape in the exemplary embodiment. The image display unit 20 includes a support body including a right holding part 21, a left holding part 23, and a front frame 27. The support body further includes a right display unit 22, a left display unit 24, a right light-guiding plate 26, and a left light-guiding plate 28.

The right holding part 21 and the left holding part 23 extend rearward from ends of the front frame 27, respectively, to hold the image display unit 20 to the head of the user in a manner similar to the temples of a pair of eyeglasses. One of the ends of the front frame 27 that lies on the right side of the user when s/he wears the image display unit 20 is referred to as an end ER, while the other end that lies on the left side of the user is referred to as an end EL. With the user wearing the image display unit 20, the right holding part 21 extends from the end ER of the front frame 27 to a position corresponding to the right temple of the user. With the user wearing the image display unit 20, the left holding part 23 extends from the end EL of the front frame 27 to a position corresponding to the left temple of the user.

The right light-guiding plate 26 and the left light-guiding plate 28 are arranged in the front frame 27. With the user wearing the image display unit 20, the right light-guiding plate 26 lies in front of the right eye of the user to allow the user to view an image with the right eye. With the user wearing the image display unit 20, the left light-guiding plate 28 lies in front of the left eye of the user to allow the user to view an image with the left eye.

The front frame 27 has a shape connecting an end of the right light-guiding plate 26 and an end of the left light-guiding plate 28 with each other. The position of connection corresponds to a position between eyebrows of the user wearing the image display unit 20. The front frame 27 may be provided with nose pads configured to come into contact with the nose of the user wearing the image display unit 20 at the position of connection between the right light-guiding plate 26 and the left light-guiding plate 28. In this case, the nose pads, the right holding part 21, and the left holding part 23 cooperate to hold the image display unit 20 to the head of the user. A belt configured to fit to the back of the head of the user wearing the image display unit 20 may be attached to the right holding part 21 and the left holding part 23. In this case, the belt serves to securely hold the image display unit 20 to the head of the user.

The right display unit 22 is configured to display an image on the right light-guiding plate 26. The right display unit 22 is arranged on the right holding part 21 and lies adjacent to the right temple of the user wearing the image display unit 20. The left display unit 24 is configured to display an image the left light-guiding plate 28. The left display unit 24 is arranged on the left holding part 23 and lies adjacent to the left temple of the user wearing the image display unit 20.

The right light-guiding plate 26 and the left light-guiding plate 28 according to the exemplary embodiment are optical parts (e.g., prisms) made of a light transmissive resin or the like, and are configured to guide imaging light output from the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light and function as wavelength filters. The dimmer plates are arranged to cover a surface of the front frame 27 (an opposite surface to a surface facing the eyes of the user), for example. The optical property of the dimmer plates can be appropriately selected to adjust the transmittance of light to a desired wavelength range, such as visible light, infrared light, and ultraviolet light, and to adjust the amount of outside light entering the right light-guiding plate 26 and the left light-guiding plate 28 and passing through the right light-guiding plate 26 and the left light-guiding plate 28.

The image display unit 20 is configured to guide imaging light generated by the right display unit 22 and the left display unit 24 to the right light-guiding plate 26 and the left light-guiding plate 28, respectively, as well as to use the imaging light to allow the user to view an image (augmented reality (AR) image) (hereinafter also referred to as "to display an image") together with an external scene viewed through the image display unit 20. When outside light coming from in front of the user passes through the right light-guiding plate 26 and the left light-guiding plate 28 and enters the eyes of the user, imaging light forming an image also enters the eyes of the user together with the outside light. This means that the visibility of an image viewed by the user can be affected by the strength of the outside light.

For this reason, the visibility of an image can be adjusted, for example, by mounting dimmer plates on the front frame 27 or by appropriately selecting or adjusting the optical properties of the dimmer plates. In a typical example, light transmissive dimmer plates having a light transmittance to allow the user wearing the HMD 100 to view at least an external scene may be selected. Suppressing sunlight may also improve visibility of the image. It is also expected that the use of dimmer plates helps protect the right light-guiding plate 26 and the left light-guiding plate 28, minimizing damage and adhesion of dust to the right light-guiding plate 26 and the left light-guiding plate 28. The dimmer plates may be removably attached to the front frame 27 or each of the right light-guiding plate 26 and the left light-guiding plate 28. Different types of removable dimmer plates may be provided for replacement or alternatively, the dimmer plates may be omitted.

A camera 61 is arranged on the front frame 27 of the image display unit 20. The camera 61 is provided on a front face of the front frame 27 at a position so that the camera 61 does not block the outside light passing through the right light-guiding plate 26 and the left light-guiding plate 28. In the example in FIG. 1, the camera 61 is arranged on the end ER of the front frame 27. The camera 61 may be arranged on the end EL of the front frame 27 or at the connection between the right light-guiding plate 26 and the left light-guiding plate 28.

The camera 61 is a digital camera equipped with an imaging lens and an imaging element, such as a charge-coupled device (CCD) or a complementary metal oxide semiconductor (CMOS). While the camera 61 according to the exemplary embodiment is a monocular camera, the camera 61 may be a stereo camera. The camera 61 is configured to capture an image of at least part of an external scene (real space) in a front direction of the HMD 100, i.e., in a direction of the field of view of the user wearing the image display unit 20. In other words, the camera 61 captures an image of a range overlapping with the field of view of the user or the direction of the field of view of the user, i.e., in a direction of a scene viewed by the user. An angle of view of the camera 61 can be appropriately set. In the exemplary embodiment, the angle of view of the camera 61 is set so that the entire field of view that the use can view through the right light-guiding plate 26 and the left light-guiding plate 28 can be captured. The camera 61 is controlled by a control function unit 150 (FIG. 6) to capture an image and output the data of the captured image to the control function unit 150.

The HMD 100 may include a distance measurement sensor configured to detect the distance to an object to be measured located along a predetermined measurement direction. The distance measurement sensor may be arranged at the connection between the right light-guiding plate 26 and the left light-guiding plate 28 of the front frame 27, for example. The measurement direction of the distance measurement sensor may be the front direction of the HMD 100 (a direction overlapping with an imaging direction of the camera 61). The distance measurement sensor may include, for example, a light-emitting part, such as an LED or a laser diode, configured to emit light, and a light-receiving part configured to receive light reflected by the object to be measured. In this case, a distance is determined by a triangulation process or a distance measurement process based on time difference. The distance measurement sensor may include, for example, a transmitting part configured to transmit ultrasonic waves and a receiving part configured to receive the ultrasonic waves reflected by an object to be measured. In this case, a distance is determined by the distance measurement process based on time difference. Similar to the camera 61, the distance measurement sensor measures a distance by following an instruction provided by the control function unit 150 and outputs the result of detection to the control function unit 150.

Figure 2:
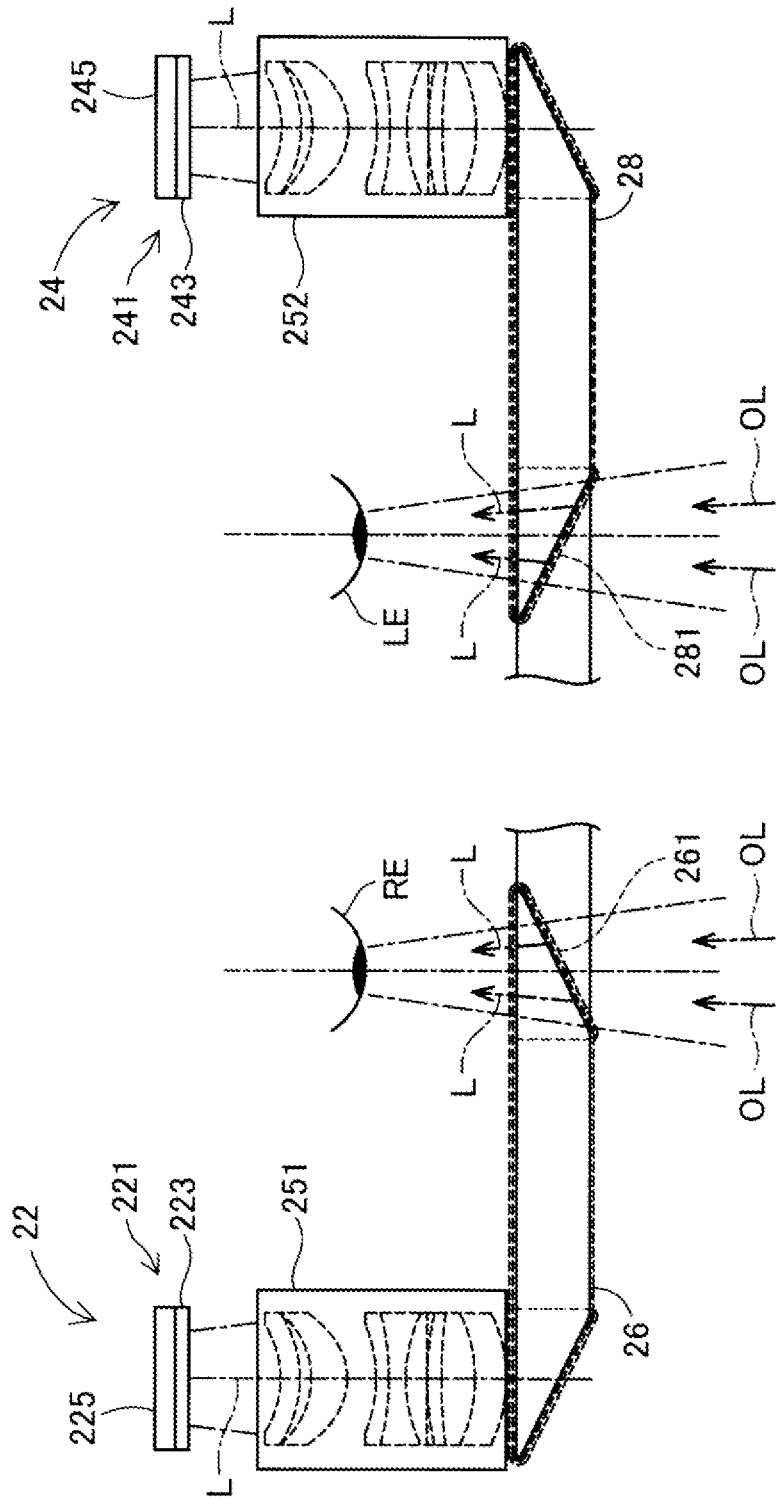
FIG. 2 is a plan view illustrating a main part of a configuration of an optical system included in the image display unit.

FIG. 2 is a plan view illustrating a main part of a configuration of an optical system included in the image display unit 20. For convenience of description, FIG. 2 illustrates the right eye RE and the left eye LE of the user. As illustrated in FIG. 2, the right display unit 22 and the left display unit 24 are arranged symmetrically on the right- and left-hand sides.

To allow the right eye RE to view an image (AR image), the right display unit 22 includes an organic light-emitting diode (OLED) unit 221 and a right optical system 251. The OLED unit 221 is configured to emit imaging light. The right optical system 251 includes a lens group and the like and is configured to guide imaging light L emitted by the OLED unit 221 to the right light-guiding plate 26.

The OLED unit 221 includes an OLED panel 223 and an OLED drive circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels, each including an R element, a G element, and a B element, arranged in a matrix.

The OLED drive circuit 225 is controlled by the control function unit 150 (FIG. 6), which will be described later, to select and power the light-emitting elements included in the OLED panel 223 to cause the light-emitting elements to emit light. The OLED drive circuit 225 is secured by bonding or the like, for example, onto a rear face of the OLED panel 223, i.e., back of a light-emitting surface. The OLED drive circuit 225 may include a semiconductor device configured to drive the OLED panel 223, for example, and may be mounted onto a substrate secured to the rear face of the OLED panel 223. The substrate is mounted with a temperature sensor 217 (FIG. 5) described later. The OLED panel 223 may be configured to include light-emitting elements to emit white color light arranged in a matrix and color filters corresponding to the R color, the G color, and the B color, respectively, disposed over the light-emitting elements. The OLED panel 223 may have a WRGB configuration including light-emitting elements configured to emit white (W) color light, in addition to light-emitting elements configured to emit R color light, G color light, and B color light, respectively.

The right optical system 251 includes a collimate lens configured to collimate the imaging light L emitted from the OLED panel 223. The imaging light L collimated by the collimate lens enters the right light-guiding plate 26. An optical path configured to guide light in the right light-guiding plate 26 is formed with a plurality of reflective faces configured to reflect the imaging light L. The imaging light L reflected multiple times within the right light-guiding plate 26 is guided to the right eye RE. The right light-guiding plate 26 is formed with a half mirror 261 (reflective face) in front of the right eye RE. The imaging light L reflected by the half mirror 261 is emitted from the right light-guiding plate 26 to the right eye RE and forms an image on the retina of the right eye RE, allowing the user to view the image.

Figure 5:
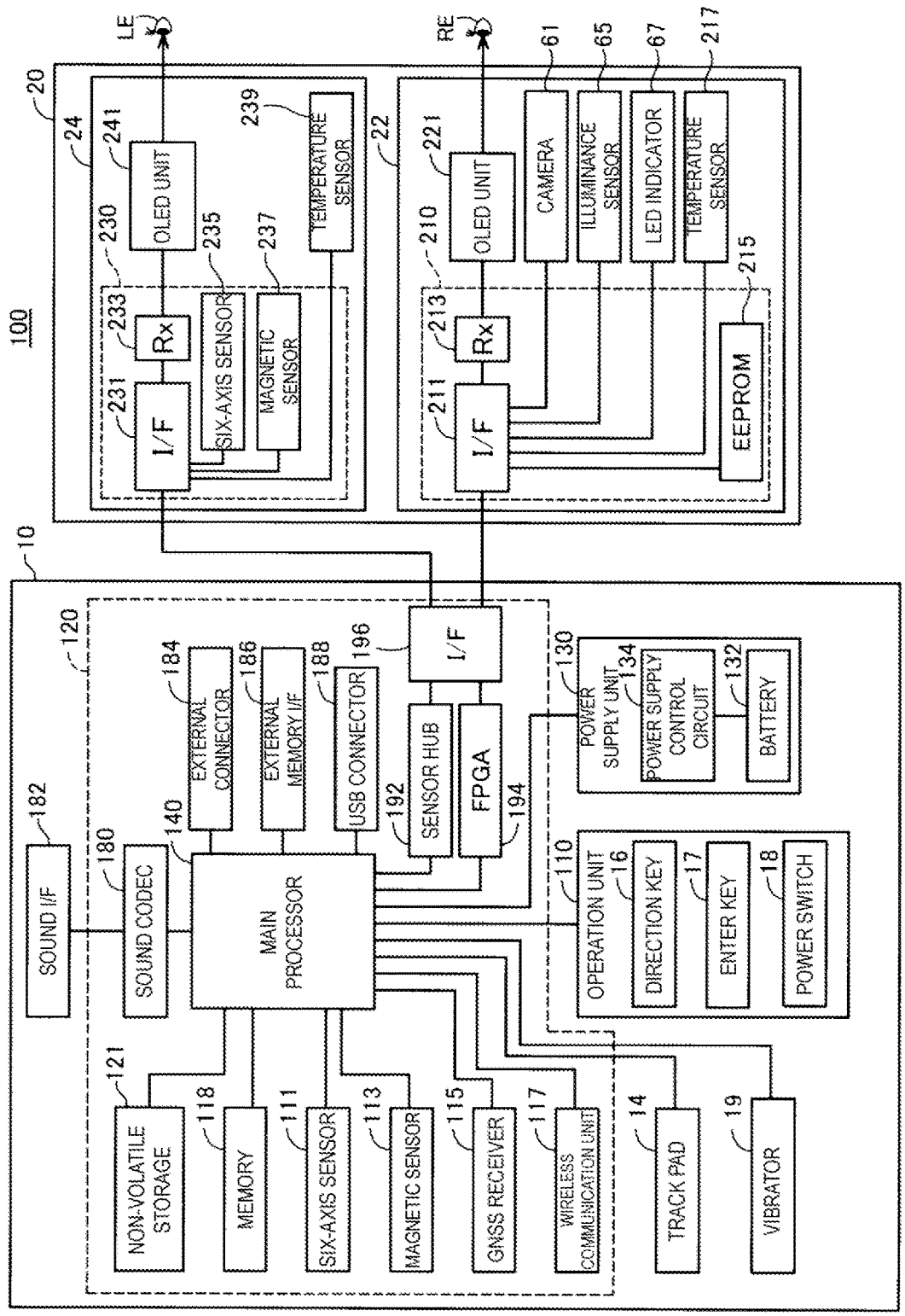
FIG. 5 is a block diagram functionally illustrating a configuration of a head-mounted display (HMD) 100.

To allow the left eye LE to view an image (AR image), the left display unit 24 includes an OLED unit 241 and a left optical system 252. The OLED unit 241 is configured to emit imaging light. The left optical system 252 includes a lens group and the like and is configured to guide imaging light L emitted from the OLED unit 241 to the left light-guiding plate 28. The OLED unit 241 includes an OLED panel 243, and an OLED drive circuit 245 configured to drive the OLED panel 243. Details of the components are identical to the OLED unit 221, the OLED panel 223, and the OLED drive circuit 225. A substrate secured to a rear face of the OLED panel 243 is mounted with a temperature sensor 239 (FIG. 5). Details of the left optical system 252 are identical to the right optical system 251 described above.

According to the configuration described above, the HMD 100 may serve as a see-through type display apparatus. That is, the imaging light L reflected by the half mirror 261 and the outside light OL passing through the right light-guiding plate 26 enter the right eye RE of the user. The imaging light L reflected by the half mirror 281 and the outside light OL passing through the left light-guiding plate 28 enter the left eye LE of the user. As described above, the HMD 100 allows the imaging light L of an image processed internally and the outside light OL to enter the eyes of the user in an overlapped manner. As a result, the user views an external scene (real world) through the right light-guiding plate 26 and the left light-guiding plate 28 while viewing a virtual image (virtual image or AR image) formed by the imaging light L overlapping with the external scene.

The right optical system 251 and the right light-guiding plate 26 are collectively referred to as a "right light-guiding unit", while the left optical system 252 and the left light-guiding plate 28 are collectively referred to as a "left light-guiding unit". Configurations of the right light-guiding unit and the left light-guiding unit are not limited to the example described above, and any desired configuration may be adopted as long as imaging light forms an image in front of the eyes of the user. For example, diffraction gratings or translucent reflective films may be used for the right light-guiding unit and the left light-guiding unit.

In FIG. 1, the control device 10 and the image display unit 20 are coupled via a coupling cable 40. The coupling cable 40 is detachably coupled to a connector provided at a lower part of the control device 10 and is also coupled from a tip of the left holding part 23 to various circuits within the image display unit 20. The coupling cable 40 includes a metal cable or an optical fiber cable configured to transmit digital data. The coupling cable 40 may further includes a metal cable configured to transmit analog data. A connector 46 is provided at a mid-point of the coupling cable 40.

The connector 46 is a jack used to couple a stereo mini-plug. The connector 46 and the control device 10 are coupled to each other with a line configured to transmit analog sound signals, for example. In the example of the exemplary embodiment illustrated in FIG. 1, the connector 46 is coupled to a headset 30 including a microphone 63, and to a right ear piece 32 and a left ear piece 34 that form a stereo headphone.

As illustrated in FIG. 1, for example, the microphone 63 is positioned with a sound collector of the microphone 63 facing in a sight direction of the user. The microphone 63 is configured to collect sound and output a sound signal to a sound interface 182 (FIG. 5). The microphone 63 may be a monaural microphone or a stereo microphone or it may be a directional microphone or a non-directional microphone.

The control device 10 is used to control the HMD 100. The control device 10 includes an illumination part 12, a track pad 14, a direction key 16, an enter key 17, and a power switch 18. The illumination part 12 is configured to notify an operation state of the HMD 100 (e.g., power ON/OFF) with its light-emitting mode. The illumination part 12 may be light-emitting diodes (LEDs), for example.

The track pad 14 is configured to detect a touch operation on an operation face of the track pad 14 and output a signal corresponding to what is detected. The track pad 14 may be any of various track pads, such as an electrostatic-type track pad, a pressure detection-type track pad, or an optical track pad. The direction key 16 is configured to detect a push operation onto a key corresponding to up, down, left, or right direction and output a signal corresponding to what is detected. The enter key 17 is configured to detect a push operation and output a signal used to determine the operation performed on the control device 10. Upon detecting a switch sliding operation, the power switch 18 switches between states of the power source of the HMD 100. In a pointer image display control process described later, when a second display control process configured to control a display mode of a pointer image in response to an entry from the control device 10 is executed, the user can control the display mode of the pointer image using the track pad 14. In the pointer image display control process, a first display control process configured to detect a movement of the head of the user and control the display mode of the pointer image in accordance with the detected amount of the rotation angle of the head is also executed. The pointer image display control process will be described later in detail.

Figure 3:
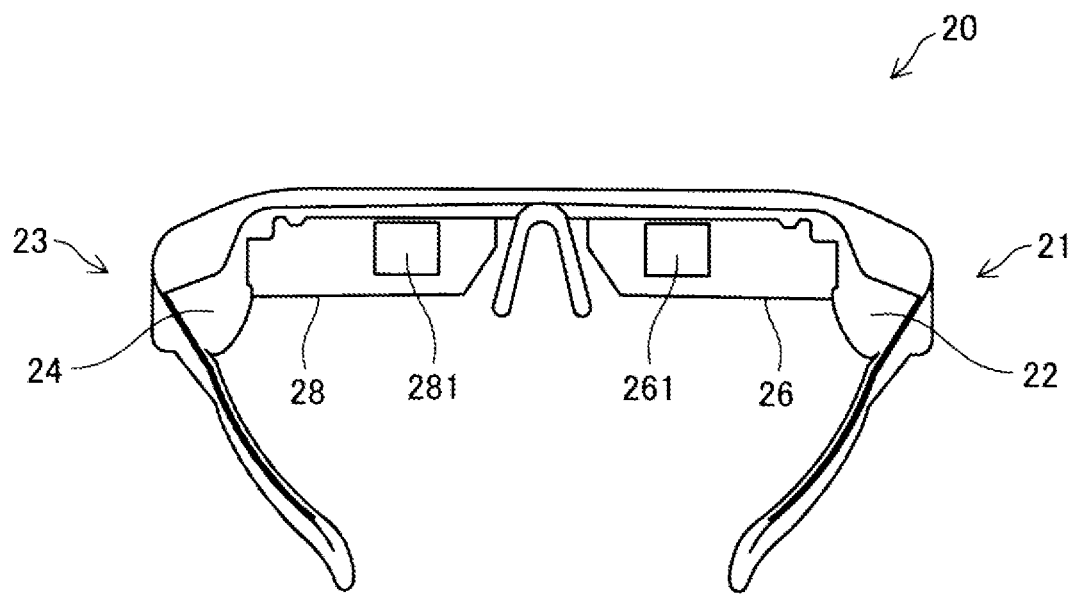
FIG. 3 is a view illustrating a main part configuration of the image display unit when viewed by a user.

FIG. 3 is a view illustrating a main part configuration of the image display unit 20 when viewed by the user. In FIG. 3, the coupling cable 40, the right ear piece 32, and the left ear piece 34 are omitted. In the state illustrated in FIG. 3, back sides of the right light-guiding plate 26 and the left light-guiding plate 28 are visible. A half mirror 261 configured to irradiate imaging light to the right eye RE and a half mirror 281 configured to irradiate imaging light to the left eye LE are also visible as approximately square-shaped regions. The user views an external scene through the entire areas of the right light-guiding plate 26 and the left light-guiding plate 28 including the half mirrors 261 and 281 while viewing rectangular display images at the positions of the half mirrors 261 and 281.

Figure 4:
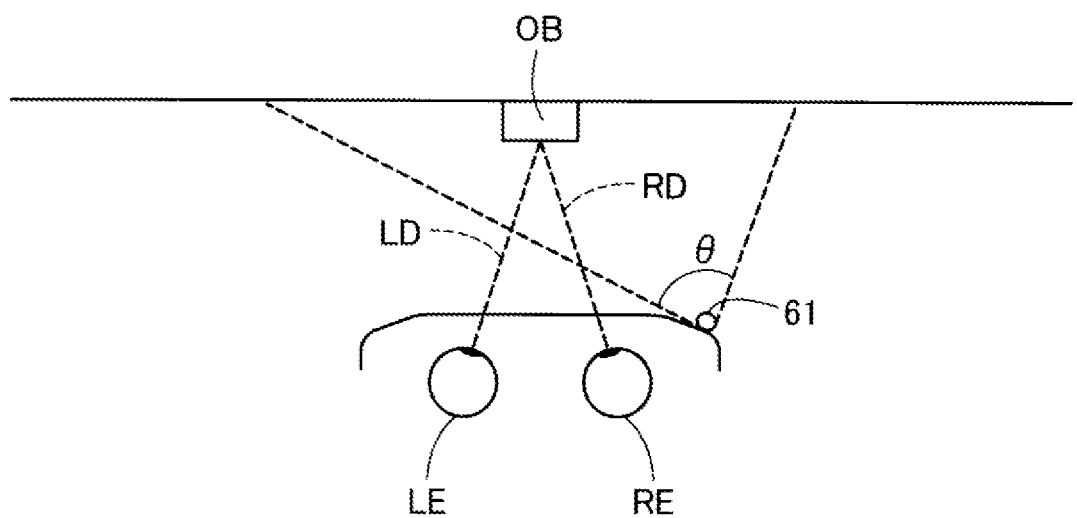
FIG. 4 is a view for describing an angle of view of a camera.

FIG. 4 is a view illustrating the angle of view of the camera 61. In FIG. 4, the camera 61, along with the right eye RE and the left eye LE of the user, are schematically illustrated in a plan view. The angle of view (imaging range) of the camera 61 is represented by θ. The angle of view θ of the camera 61 extends not only in a horizontal direction as illustrated in the figure, but also in a perpendicular direction as with any common digital camera.

As described above, the camera 61 is arranged at an end on the right-hand side of the image display unit 20 to capture an image in the sight direction of the user (i.e., in front of the user). For this purpose, the optical axis of the camera 61 extends in a direction including sight directions of the right eye RE and the left eye LE. The external scene viewable by the user wearing the HMD 100 is not necessarily an infinitely distant scene. For example, when the user fixates on an object OB with both eyes, the line-of-sight of the user is directed to the object OB as illustrated by RD and LD in the figure. In this case, the distance from the user to the object OB often ranges from approximately 30 cm to 10 m, both inclusive, and more often ranges from 1 m to 4 m, both inclusive. Based upon this, standard maximum and minimum distances from the user to the object OB that the user can take during normal use of HMD 100 may be specified. These standards may be predetermined and preset on the HMD 100 or they may be set by the user. It is preferred that the optical axis and the angle of view of the camera 61 be determined such that the object OB is included within the angle of view when the distance to the object OB during normal use corresponds to the set standards of the maximum and minimum distances.

In general, the viewing angle of a human is known to be approximately 200 degrees in the horizontal direction and approximately 125 degrees in the vertical direction. Within these angles, an effective field of view advantageous for information acceptance performance is 30 degrees in the horizontal direction and 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. In this case, when the point of fixation lies on the object OB (FIG. 4), the effective field of view is approximately 30 degrees in the horizontal direction and approximately 20 degrees in the vertical direction around the line-of-sights RD and LD. The stable field of view of fixation ranges from approximately 60 degrees to 90 degrees, both inclusive, in the horizontal direction and from approximately 45 degrees to 70 degrees, both inclusive, in the vertical direction. The field of view of the user actually viewing an object through the image display unit 20, the right light-guiding plate 26, and the left light-guiding plate 28 is referred to as an actual field of view (FOV). The actual field of view is narrower than the viewing angle and the stable field of fixation, but wider than the effective field of view.

The angle of view θ of the camera 61 according to the exemplary embodiment is set so that the camera can capture a range wider than the field of view of the user. The angle of view θ of the camera 61 is set so that the camera can capture preferably a range wider than at least the effective field of view of the user, and more preferably a range wider than the actual field of view. Still more preferably, the angle of view θ of the camera 61 is set so that the camera can capture a range wider than the stable field of fixation of the user, and most preferably a range wider than the viewing angle of the eyes of the user. Thus, the camera 61 may be equipped with a wide angle lens as an imaging lens and may be configured to capture a wider angle of view. The wide angle lens may be a super wide angle lens or semi-wide angle lens. The camera 61 may be equipped with a fixed focal lens, a zoom lens, or a lens group including a plurality of lenses.

FIG. 5 is a block diagram functionally illustrating a configuration of the HMD 100. The control device 10 includes a main processor 140 configured to execute a program to control the HMD 100, storages, input and output units, sensors, interfaces, and a power supply unit 130. The main processor 140 is coupled to the storages, the input and output units, the sensors, the interfaces, and the power supply unit 130. The main processor 140 is mounted on a controller substrate 120 built into the control device 10.

The storage include a memory 118 and a non-volatile storage 121. The memory 118 configures a work area used to temporarily store a computer program to be executed and data to be processed by the main processor 140. The non-volatile storage 121 includes a flash memory and an embedded multi-media card (eMMC). The non-volatile storage 121 is configured to store computer programs to be executed by the main processor 140 and various data to be processed by the main processor 140. In the exemplary embodiment, the storages are mounted on the controller substrate 120.

The input and output units include the track pad 14 and an operation unit 110. The operation unit 110 includes the direction key 16, the enter key 17, and the power switch 18 included in the control device 10. The main processor 140 is configured to control the input and output units and acquire signals output from the input and output units.

The sensors include a six-axis sensor 111, a magnetic sensor 113, and a global navigation satellite system (GNSS) receiver 115. The six-axis sensor 111 is a motion sensor (inertial sensor) including a three-axis acceleration sensor and a three-axis gyro (angular velocity) sensor. The six-axis sensor 111 may include an inertial measurement unit (IMU) in which the sensors are provided as modules. The magnetic sensor 113 is a three-axis geomagnetic sensor, for example. The GNSS receiver 115 is configured to determine a present position (longitude and latitude) of the control device 10 based on navigation signals received from an artificial satellite configuring the GNSS. The sensors (six-axis sensor 111, magnetic sensor 113, and GNSS receiver 115) output detected values to the main processor 140 in accordance with a predetermined sampling frequency. The sensors may output detected values at timings instructed by the main processor 140.

The interfaces include a wireless communication unit 117, a sound codec 180, an external connector 184, an external memory interface 186, a universal serial bus (USB) connector 188, a sensor hub 192, a field programmable gate array (FPGA) 194, and an interface 196. The components function as an interface to external devices.

The wireless communication unit 117 is configured to execute wireless communications between the HMD 100 and an external device. The wireless communication unit 117 includes an antenna (not illustrated), a radio frequency (RF) circuit, a baseband circuit, a communication control circuit, and the like or is configured as a device with the above-described components integrated each other. The wireless communication unit 117 is configured to perform wireless communications conforming to standards of wireless LAN, such as Bluetooth (trade name) and Wi-Fi (trade name), for example.

The sound codec 180 is coupled to the sound interface 182 and is configured to encode and decode sound signals input and output via the sound interface 182. The sound interface 182 is an interface configured to receive and output sound signals. The sound codec 180 may include an analog/digital (A/D) converter configured to convert an analog sound signal into digital sound data and a digital/analog (D/A) converter configured to perform the opposite conversion. The HMD 100 according to the exemplary embodiment outputs sounds from the right ear piece 32 and the left ear piece 34 and collects sounds from the microphone 63. The sound codec 180 converts digital sound data output from the main processor 140 into an analog sound signal and outputs the analog sound signal via the sound interface 182. The sound codec 180 converts an analog sound signal input into the sound interface 182 into digital sound data, and outputs the digital sound data to the main processor 140.

The external connector 184 is a connector configured to couple the main processor 140 to an external device (e.g., personal computer, smart phone, or game device) configured to perform communications with the main processor 140. The external device coupled to the external connector 184 may serve as a source of contents, may debug a computer program to be executed by the main processor 140, and may collect a log of how the HMD 100 has been operated. The external connector 184 may take various forms. The external connector 184 may be an interface conforming to wired coupling, such as an USB interface, a micro USB interface, or a memory card interface, or an interface conforming to wireless coupling, such as a wireless LAN interface or a Bluetooth interface.

The external memory interface 186 is an interface configured to couple a portable memory device. The external memory interface 186 includes an interface circuit and a memory card slot configured to accept a card-type recording medium for reading and writing data, for example. For example, the size and shape of the card-type recording medium, as well as standards for the card-type recording medium, may be appropriately selected. The USB connector 188 is an interface configured to couple a memory device, a smart phone, or a personal computer conforming to the USB standard, for example. The USB connector 188 includes a connector conforming to the USB standard, and an interface circuit, for example. For example, the size and shape of the USB connector 188, as well as the version of the USB standard for the USB connector 188, may be appropriately selected.

The HMD 100 further includes a vibrator 19. The vibrator 19 includes a motor (not illustrated), an eccentric rotor, and the like, and is controlled by the main processor 140 to generate vibration. The HMD 100 causes the vibrator 19 to vibrate in a predetermined vibration pattern when an operation to the operation unit 110 is detected, or when a power supply to the HMD 100 is turned on or off, for example. Instead of providing the vibrator 19 in the control device 10, the vibrator 19 may be provided in the image display unit 20, such as in the right holding part 21 (right temple side) of the image display unit.

The sensor hub 192 and the FPGA 194 are coupled to the image display unit 20 via the interface (I/F) 196. The sensor hub 192 is configured to acquire detected values of the sensors included in the image display unit 20 and output the detected values to the main processor 140. The FPGA 194 is configured to process data to be transmitted and received between the main processor 140 and components of the image display unit 20, as well as to execute transmissions via the interface 196. The interface 196 is coupled to the right display unit 22 and the left display unit 24 of the image display unit 20. In the example of the exemplary embodiment, the coupling cable 40 is coupled to the left holding part 23. A wire coupled to the coupling cable 40 is arranged in the image display unit 20 to couple the right display unit 22 and the left display unit 24 to the interface 196 of the control device 10.

Figure 6:
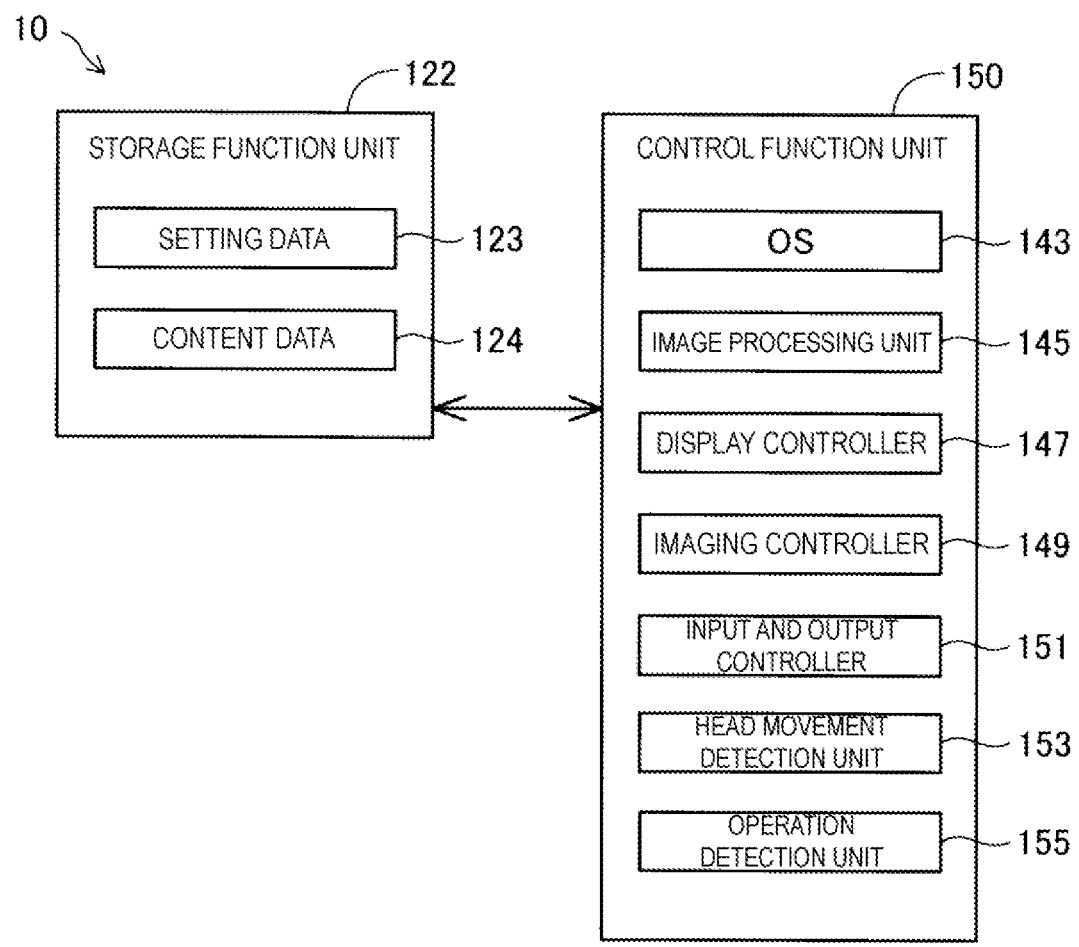
FIG. 6 is a block diagram functionally illustrating a configuration of a control device.

The power supply unit 130 includes a battery 132 and a power supply control circuit 134. The power supply unit 130 is configured to supply power to the control device 10 for operation. The battery 132 is a rechargeable battery. The power supply control circuit 134 is configured to detect a remaining amount of the battery 132 and control charging of an operating system (OS) 143 (FIG. 6). The power supply control circuit 134 is coupled to the main processor 140, and is configured to output the detected value of the remaining amount of the battery 132 and the detected value of a voltage of the battery 132 to the main processor 140. Power may be supplied from the control device 10 to the image display unit 20 based on the power supplied by the power supply unit 130. The main processor 140 may be configured to control how power is supplied from the power supply unit 130 to components of the control device 10 and the image display unit 20.

The right display unit 22 includes a display unit substrate 210, the OLED unit 221, the camera 61, an illuminance sensor 65, an LED indicator 67, and the temperature sensor 217. The display unit substrate 210 is mounted with an interface (I/F) 211 coupled to the interface 196, a receiving unit (Rx) 213, and an electrically erasable programmable read-only memory (EEPROM) 215. The receiving unit 213 is configured to receive data entered from the control device 10 via the interface 211. Upon receiving image data of an image to be displayed on the OLED unit 221, the receiving unit 213 outputs the received image data to the OLED drive circuit 225 (FIG. 2).

The EEPROM 215 is configured to store various data in a form readable by the main processor 140. The EEPROM 215 stores data about a light-emitting property and a display property of the OLED units 221 and 241 of the image display unit 20, and data about a sensor property of the right display unit 22 or the left display unit 24, for example. Specifically, the EEPROM 215 stores parameters regarding Gamma correction performed by the OLED units 221 and 241, and data used to compensate for the detected values of the temperature sensors 217 and 239 described later, for example. These data are generated when the HMD 100 is inspected upon shipping from a factory, and written into the EEPROM 215. After shipping, the main processor 140 reads and utilizes the data in the EEPROM 215 for various processing.

The camera 61 captures an image in accordance with a signal entered via the interface 211 and outputs imaging data or a signal indicative of the result of imaging to the control device 10. As illustrated in FIG. 1, the illuminance sensor 65 is arranged on the end ER of the front frame 27 and is configured to receive outside light coming from in front of the user wearing the image display unit 20. The illuminance sensor 65 is configured to output a detected value corresponding to the amount of received light (intensity of received light). As illustrated in FIG. 1, the LED indicator 67 is arranged adjacent to the camera 61 on the end ER of the front frame 27. The LED indicator 67 is configured to turn on while the camera 61 is capturing images to notify that the capturing is in progress.

The temperature sensor 217 is configured to detect a temperature and output a voltage value or a resistance value corresponding to the detected temperature. The temperature sensor 217 is mounted on the rear face of the OLED panel 223 (FIG. 2). The temperature sensor 217 and the OLED drive circuit 225 may be mounted on a single substrate, for example. With this configuration, the temperature sensor 217 mainly detects the temperature of the OLED panel 223. The temperature sensor 217 may be built into the OLED panel 223 or the OLED drive circuit 225 (FIG. 2). For example, when the OLED panel 223 is mounted as an Si-OLED together with the OLED drive circuit 225 to form an integrated circuit on an integrated semiconductor chip, the temperature sensor 217 may be mounted on the semiconductor chip.

The left display unit 24 includes a display unit substrate 230, the OLED unit 241, and the temperature sensor 239. The display unit substrate 230 is mounted with an interface (I/F) 231 coupled to the interface 196, a receiving unit (Rx) 233, a six-axis sensor 235, and a magnetic sensor 237. The receiving unit 233 is configured to receive data entered from the control device 10 via the interface 231. Upon receiving image data of an image to be displayed on the OLED unit 241, the receiving unit 233 outputs the received image data to the OLED drive circuit 245 (FIG. 2).

The six-axis sensor 235 is a motion sensor (inertial sensor) including a three-axis acceleration sensor and a three-axis gyro (angular velocity) sensor. The six-axis sensor 235 may be an IMU in which the above-described sensors are provided as modules. The magnetic sensor 237 is a three-axis geomagnetic sensor, for example. The six-axis sensor 235 and the magnetic sensor 237 are provided in the image display unit 20 so that they can detect a movement of the head of the user while the image display unit 20 is mounted on the user's head. Based on the detected movement of the head, orientation of the image display unit 20, i.e., the field of view of the user, is determined.

The temperature sensor 239 is configured to detect a temperature and output a voltage value or a resistance value corresponding to the detected temperature. The temperature sensor 239 is mounted on the rear face of the OLED panel 243 (FIG. 2). The temperature sensor 239 and the OLED drive circuit 245 may be mounted on a single substrate, for example. With this configuration, the temperature sensor 239 mainly detects a temperature of the OLED panel 243. The temperature sensor 239 may be built into the OLED panel 243 or the OLED drive circuit 245 (FIG. 2). Details are identical to the temperature sensor 217.

The camera 61, the illuminance sensor 65, and the temperature sensor 217 of the right display unit 22, and the six-axis sensor 235, the magnetic sensor 237, and the temperature sensor 239 of the left display unit 24 are coupled to the sensor hub 192 of the control device 10. The sensor hub 192 is configured to be controlled by the main processor 140 to set and initialize sampling periods of the sensors. Based on the sampling periods of the sensors, the sensor hub 192 supplies power to the sensors, transmits control data, and acquires detected values, for example. At a pre-set timing, the sensor hub 192 outputs detected values of the sensors included in the right display unit 22 and the left display unit 24 to the main processor 140. The sensor hub 192 may have a cache function configured to temporarily store detected values of the sensors. The sensor hub 192 may have a function to convert a signal format or a data format of detected values of the sensors (e.g., function to convert into a standard format). The sensor hub 192 is controlled by the main processor 140 to start and stop supplying power to the LED indicator 67 to turn on or off the LED indicator 67.

FIG. 6 is a block diagram functionally illustrating a configuration of the control device 10. The control device 10 functionally includes a storage function unit 122 and the control function unit 150. The storage function unit 122 is a logical storage based on the non-volatile storage 121 (FIG. 5). Instead of a configuration where only the storage function unit 122 is used, the storage function unit 122 may be configured to use the EEPROM 215 and the memory 118 in combination with the non-volatile storage 121. The control function unit 150 is configured upon the main processor 140 executing a computer program, i.e., upon hardware and software operating together.

The storage function unit 122 stores various data for processing by the control function unit 150. Specifically, the storage function unit 122 according to the exemplary embodiment stores setting data 123 and content data 124. The setting data 123 includes various set values regarding operation of the HMD 100. For example, the setting data 123 includes parameters, determinants, computing equations, look-up tables (LUTs), and the like used when the control function unit 150 controls the HMD 100. In the pointer image display control process described later, a display position of the pointer image when switching from the second display control process to the first display control process takes place is stored in the setting data 123.

The content data 124 includes data of contents including images and movies to be displayed on the image display unit 20 as the image display unit is controlled by the control function unit 150 (image data, movie data, sound data, and the like). The content data 124 may include data of bidirectional content. Bidirectional content denotes a type of content which is displayed by the image display unit 20 in accordance with what is processed by the control function unit 150 based on a user's operation acquired by the operation unit 110. In this case, data of content may include image data of a menu screen used to acquire an operation of the user, data determining a process corresponding to an item included in the menu screen, and the like.

The control function unit 150 is configured to utilize the data stored in the storage function unit 122 to execute various processes, thereby performing functions as the operating system (OS) 143, an image processing unit 145, a display controller 147, an imaging controller 149, an input and output controller 151, a head movement detection unit 153, and an operation detection unit 155. In the exemplary embodiment, function units other than the OS 143 are configured as computer programs to be executed on the OS 143.

The image processing unit 145 is configured to generate a signal to be transmitted to the right display unit 22 and the left display unit 24 based on image data or movie data to be displayed on the image display unit 20. Signals generated by the image processing unit 145 may be a vertical synchronizing signal, a horizontal synchronizing signal, a clock signal, an analog image signal, or the like. The image processing unit 145 may be achieved when the main processor 140 executes a computer program or may be a separate hardware from the main processor 140 (e.g., digital signal processor (DSP)).

As necessary, the image processing unit 145 may execute a resolution conversion process, an image adjustment process, a 2D/3D conversion process, and the like. The resolution conversion process is a process configured to convert the resolution of image data into a resolution appropriate for the right display unit 22 and the left display unit 24. The image adjustment process is a process configured to adjust the brightness and saturation of image data. The 2D/3D conversion process is a process configured to generate two-dimensional image data from three-dimensional image data, or generate three-dimensional image data from two-dimensional image data. When one of the processes is executed, the image processing unit 145 generates a signal for displaying an image based on the processed image data and transmits the signal to the image display unit 20 via the coupling cable 40.

The display controller 147 is configured to generate a control signal for controlling the right display unit 22 and the left display unit 24 and use the control signal to control the generation and emission of the imaging light by each of the right display unit 22 and the left display unit 24. Specifically, the display controller 147 controls the OLED drive circuits 225 and 245 to cause the OLED panels 223 and 243 to display images. Based on a signal output from the image processing unit 145, the display controller 147 controls a timing when the OLED drive circuits 225 and 245 draw images on the OLED panels 223 and 243 and controls brightness of the OLED panels 223 and 243, for example.

During the pointer image display control process described later, the display controller 147 controls the display mode of the pointer image within a display region of the image display unit 20. The term "display mode of the pointer image" denotes an overall display mode of a pointer image, including speed, size, shape, color, pattern, and the like of the pointer image. The pointer image display control process includes two display control processes: the first display control process and the second display control process described above. The first display control process is a process by which the movement of user's head is detected and the display mode of the pointer image is controlled in accordance with the detected amount of the rotation angle of the head. The second display control process is a process by which the display mode of the pointer image is controlled in response to an entry from the control device 10.

The imaging controller 149 is configured to control the camera 61 to capture an image and generate captured imaging data, and to cause the storage function unit 122 to temporarily store the captured imaging data. When the camera 61 is configured as a camera unit including a circuit configured to generate imaging data, the imaging controller 149 acquires the imaging data from the camera 61 and causes the storage function unit 122 to temporarily store the imaging data.

The input and output controller 151 is configured to appropriately control the track pad 14 (FIG. 1), the direction key 16, and the enter key 17 to receive entered instructions. The received entered instructions are output to the OS 143 or to a computer program to be executed on the OS 143 together with the OS 143. In the exemplary embodiment, the input and output controller 151 receives a second operation entry by the user during the pointer image display control process described later. The term "second operation entry" denotes an entry from the control device 10 and includes a tapping operation on the track pad 14 or grabbing of the control device 10, for example.

The head movement detection unit 153 is configured to detect a movement of the head of the user of the HMD 100. The head movement detection unit 153 utilizes the result of detection of the six-axis sensor 235 to acquire movement, speed, acceleration, angular velocity, orientation, changes in orientation of the head of the user and detects the amount of the rotation angle of the head with respect to a predetermined position of the HMD 100. In the exemplary embodiment, the term "predetermined position" (hereinafter referred to as a "reference position") denotes a central position of the image display unit 20 of the HMD 100 mounted on the head of the user upon initiation of the first display control process. The reference position and the amount of the rotation angle of the head will be described later in detail.

The operation detection unit 155 is configured to detect a first operation entry by the user. In the exemplary embodiment, the term "first operation entry" denotes a predetermined operation entry by the user into the HMD 100 that triggers switching between the first display control process and the second display control process. For example, the first operation entry includes knocking on the HMD 100 a predetermined number of times. The "predetermined number of times" is twice. However, the predetermined number of times may be any desired number of times other than twice.

In the exemplary embodiment, the control device 10 corresponds to a subordinate concept to an input device described in Summary. Also, the storage function unit 122 corresponds to a subordinate concept to a position storing unit described in Summary and the input and output controller 151 corresponds to a subordinate concept to an entry receiving unit described in Summary.

A2. Augmented Reality Display

Figure 7:
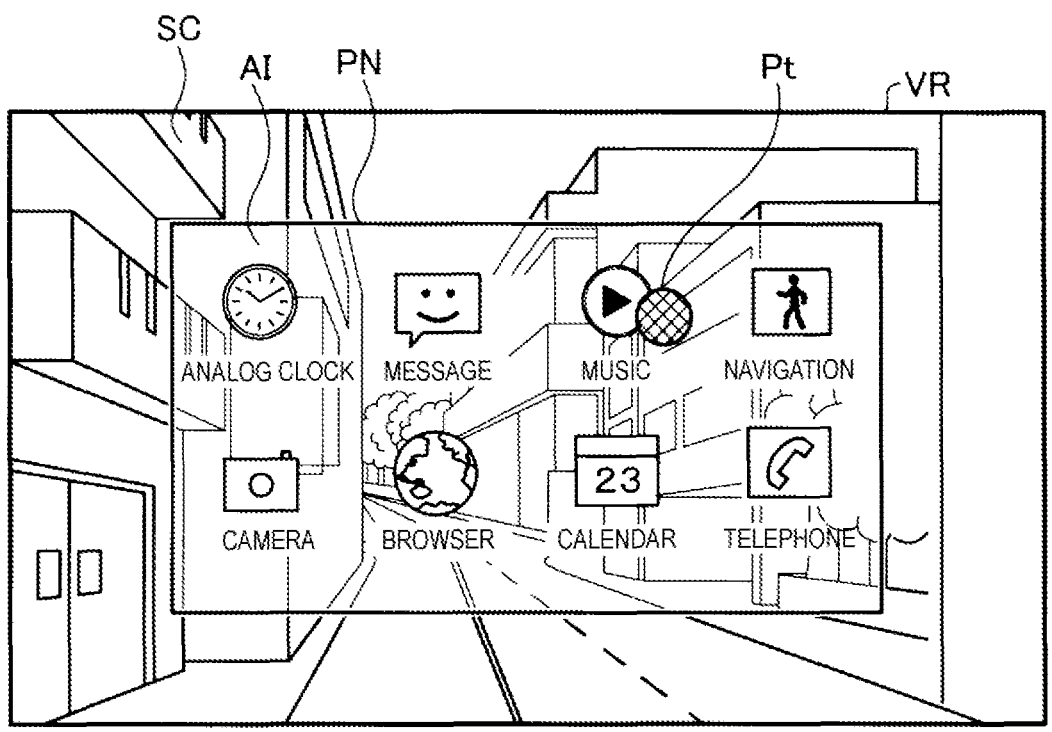
FIG. 7 is an explanatory view illustrating an example of augmented reality display by the HMD 100.

FIG. 7 is an explanatory view illustrating an example of augmented reality display by the HMD 100. FIG. 7 illustrates a field of view VR of the user. As described above, as imaging light guided to the eyes of the user of the HMD 100 forms an image on the retina of the user, the user views a display object image AI as augmented reality (AR) within a display region PN. In the example illustrated in FIG. 7, the object image AI is the menu screen of the OS of the HMD 100. The menu screen includes icon images for activating application programs of "Analog clock", "Message", "Music", "Navigation", "Camera", "Browser", "Calendar", and "Telephone", for example. Meanwhile, the right light-guiding plate 26 and the left light-guiding plate 28 transmit light from an external scene to allow the user to view the external scene SC. As described above, the user of the HMD 100 according to the exemplary embodiment views the object image AI overlaying the external scene SC in an area of the field of view VR where the object image AI is displayed. The user views only the external scene SC in an area of the field of view VR where the object image AI is not displayed.

As illustrated in FIG. 7, a pointer image Pt is displayed on the object image AI. In FIG. 7, for convenience of description, the pointer image Pt is illustrated enlarged relative to the pointer image actually viewed by the user. The pointer image Pt is used by the user to select a menu displayed on the object image AI. In the example illustrated in FIG. 7, the user moves the pointer image Pt onto the "Music" icon image on the object image AI to select a "Music" menu. In this state, the user can tap on the track pad 14 to run the "Music" menu.

In the exemplary embodiment, the term "pointer image" denotes an indication of a position of an operation involved in the GUI operation that indicates the position at which the operation is made on the object image AI and denotes a mouse pointer image in the exemplary embodiment. Instead of the mouse pointer, any pointer image may be used, such as a marker and a mouse cursor. In the example illustrated in FIG. 7, the pointer image Pt has a circular shape. Instead of the circular shape, the pointer image Pt may have any desired shape, including an arrow shape, a geometric shape such as triangle and square, and may be a symbol. The pointer image Pt may be a pattern.

Figure 8:
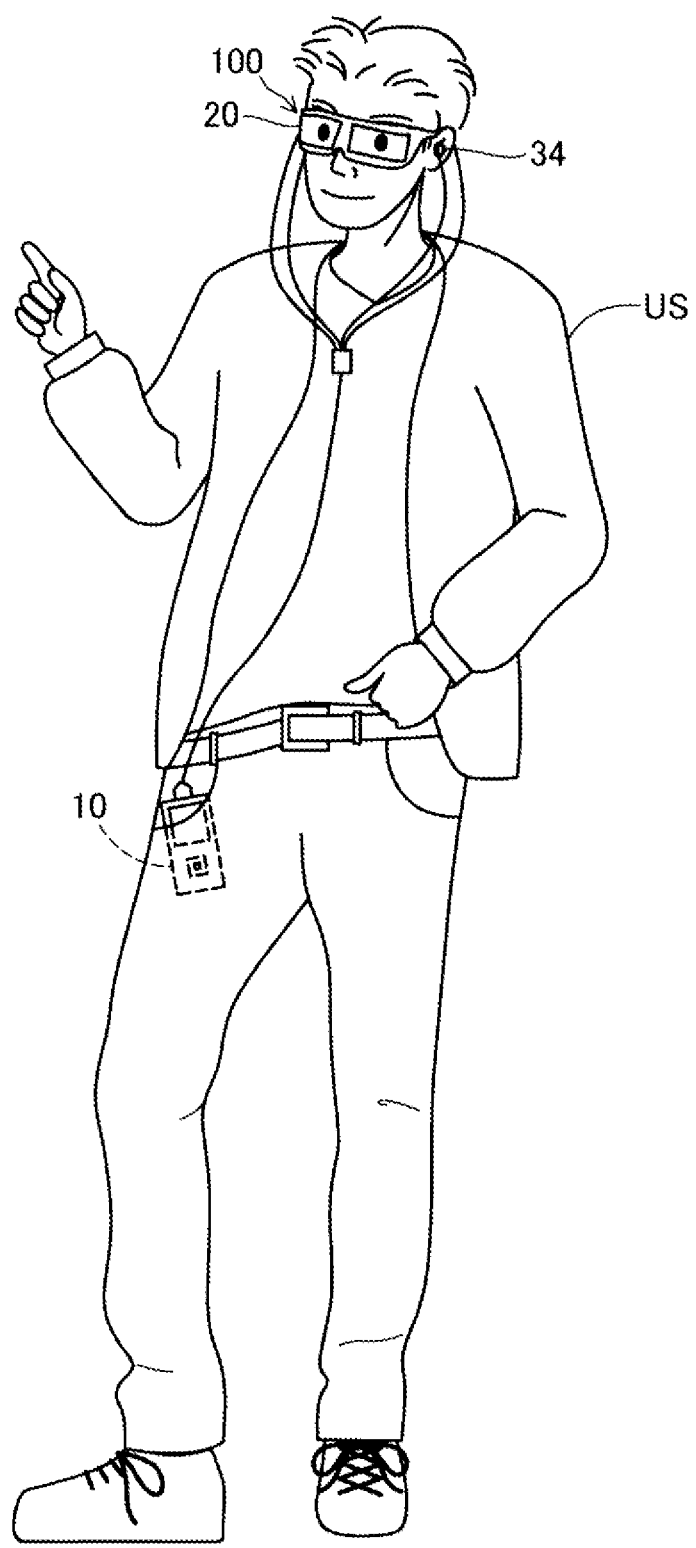
FIG. 8 is an explanatory view schematically illustrating how the user wears the HMD 100.

FIG. 8 is an explanatory view schematically illustrating how the user wears the HMD 100. In the exemplary embodiment, the user US is walking while wearing the HMD 100 with the control device 10 in his/her pocket. Thus, the user US has to take the control device 10 out of his/her pocket each time he wants to operate the HMD 100 using the control device 10. However, the user US may control the HMD 100 without holding the control device 10 in his/her hand by executing the first display control process for detecting the movement of the head of the user US to control the display mode of the pointer image Pt in accordance with the detected amount of the rotation angle of the head during the pointer image display control process described later. In a case where the user US has taken the control device 10 out of his/her pocket and held it in his\her hand, the second display control process is executed instead, allowing the user US to operate the control device 10 to control the display mode of the pointer image Pt. How the processes are executed will be specifically described below.

A3. Pointer Image Display Control Process

Figure 9:
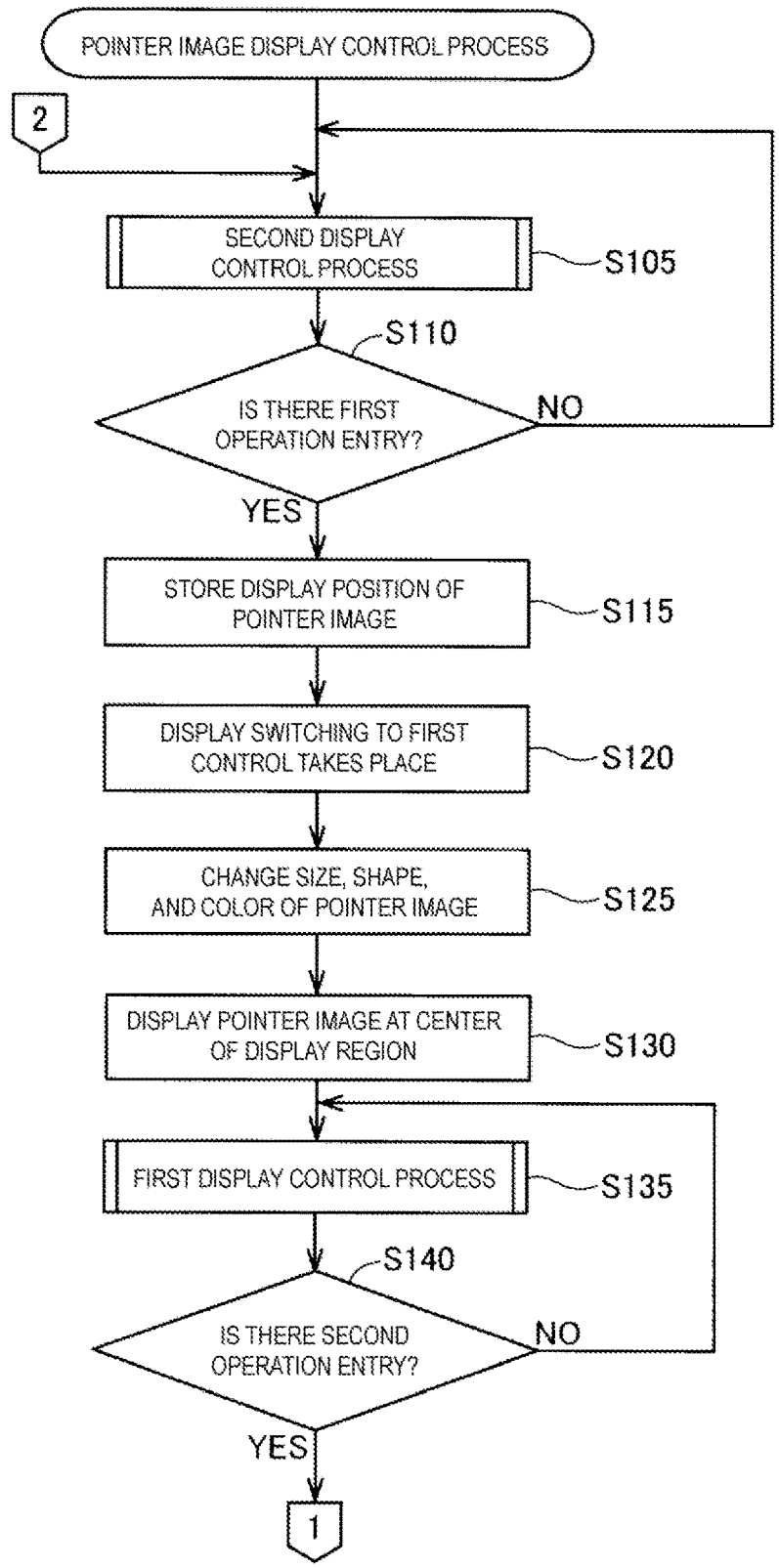
FIG. 9 is a flowchart illustrating how a pointer image display control process proceeds.
Figure 10:
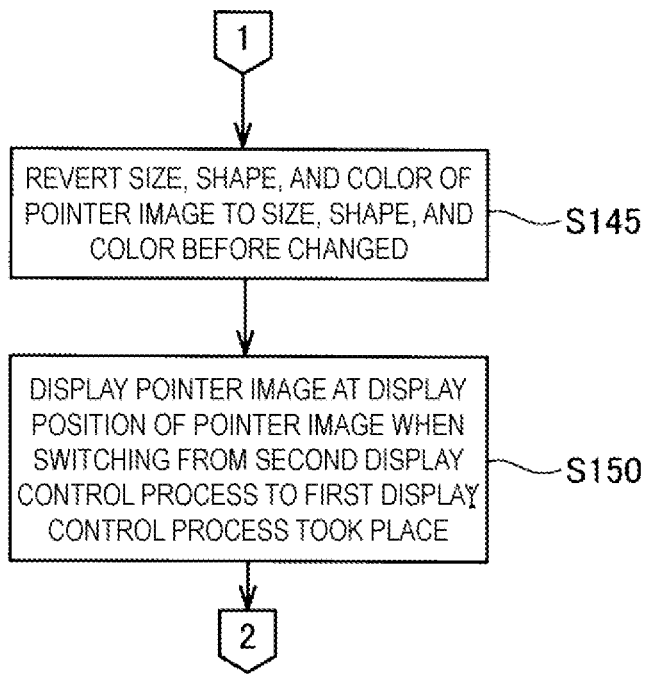
FIG. 10 is a flowchart illustrating how the pointer image display control process proceeds.

FIGS. 9 and 10 are flowcharts illustrating how the pointer image display control process proceeds. The pointer image display control process starts upon activation of a predetermined application. In the exemplary embodiment, when the "Music" menu illustrated in FIG. 7 is executed and the "Music" application is activated, the pointer image display control process starts. As illustrated in FIG. 9, the display controller 147 executes a second display control process (Step S105).

Figure 11:
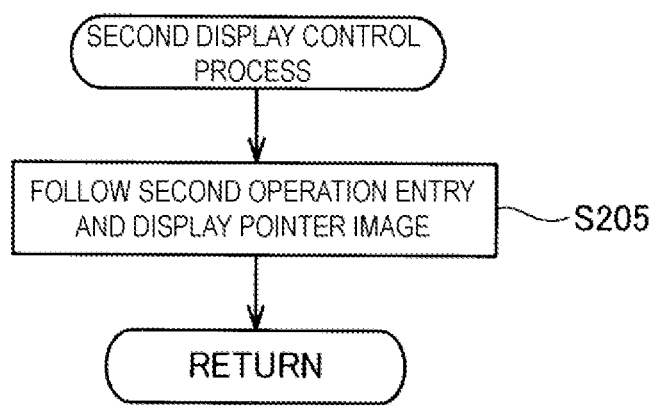
FIG. 11 is a flowchart illustrating how a second display control process proceeds.

FIG. 11 is a flowchart illustrating how the second display control process proceeds. The display controller 147 displays the pointer image Pt in response to a second operation entry (Step S205). Specifically, in response to an entry from the control device 10 received by the input and output controller 151, the display controller 147 controls the display mode of the pointer image Pt for displaying the pointer image Pt, for example, by moving the position of the pointer image Pt or by executing a corresponding function assigned to one of the operation icon images Ic on which the pointer image Pt is overlaid. Following step S205, step S110 is executed as illustrated in FIG. 9.

As illustrated in FIG. 9, the operation detection unit 155 determines whether the first operation entry has been made (Step S110). Specifically, the operation detection unit 155 utilizes the result of detection by the six-axis sensor 235 to determine the number of knocks onto the HMD 100, intensity of the knocks, and an input direction of the knocks to determine whether the first operation entry has been made.

If it is determined that the first operation entry has not been made (Step S110: NO), then the flow returns to step S105 described above and steps S105 and S110 are repeated. On the other hand, if it is determined that the first operation entry has been made (Step S110: YES), then the display controller 147 stores the display position of the pointer image Pt in the setting data 123 (Step S115). Following step S115, the display controller 147 displays a message indicating that switching to the first control will take place (Step S120).

Figure 12:
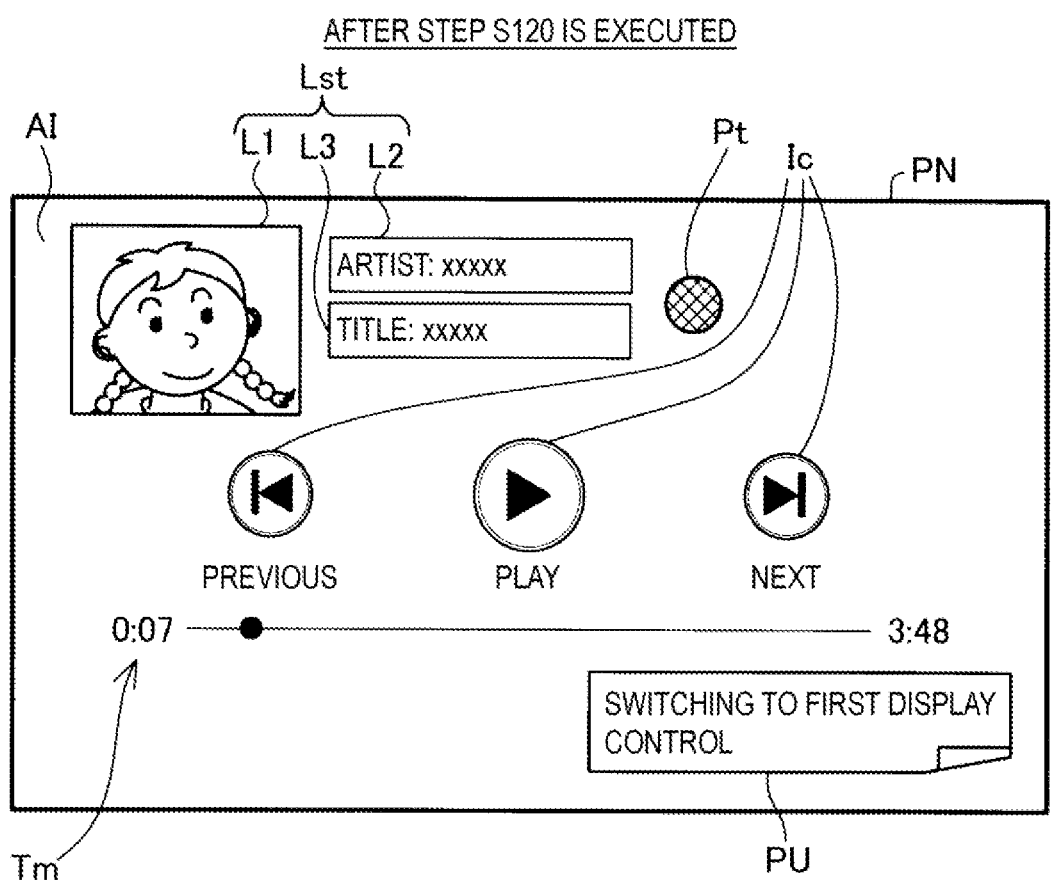
FIG. 12 is an explanatory view schematically illustrating a display region after step S120 has been executed.

FIG. 12 is an explanatory view schematically illustrating the display region PN after step S120 has been executed. In FIG. 12, for convenience of description, the external scene SC is omitted. As illustrated in FIG. 12, the object image AI, the pointer image Pt, and a pop-up image PU are displayed in the display region PN. The object image AI is a "Music" operation screen including a music information Lst, a play time Tm, and operation icon images Ic. The music information Lst is information about the music being played and includes an artist image L1, an artist name L2, and a title of music L3. The play time Tm is information indicating play time and remaining play time of the music being played. The operation icon images Ic are operation buttons used to execute functions of the "Music" application. The operation icon images are assigned with corresponding operations. The user US of the HMD 100 can then execute the assigned function by performing an "Enter" operation while the pointer image Pt is overlaid on one of the operation icon images. The pointer image Pt is displayed at the same position and with the same shape as it is displayed when the "Music" menu illustrated in FIG. 7 is executed.

As illustrated in FIG. 12, the pop-up image PU is displayed as a message indicating that switching to the first display will take place. The pop-up image PU is displayed with a higher brightness than the object image AI and the pointer image Pt. In this manner, the pop-up image PU can be made more distinctive than the object image AI and the pointer image Pt, such that the user US of the HMD 100 can readily recognize that switching from the second display control process to the first display control process will take place.

As illustrated in FIG. 9, following step S120, the display controller 147 changes the size, shape, and color of the pointer image Pt (Step S125). Following step S125, the display controller 147 displays the pointer image Pt at the center of the display region PN (Step S130).

Figure 13:
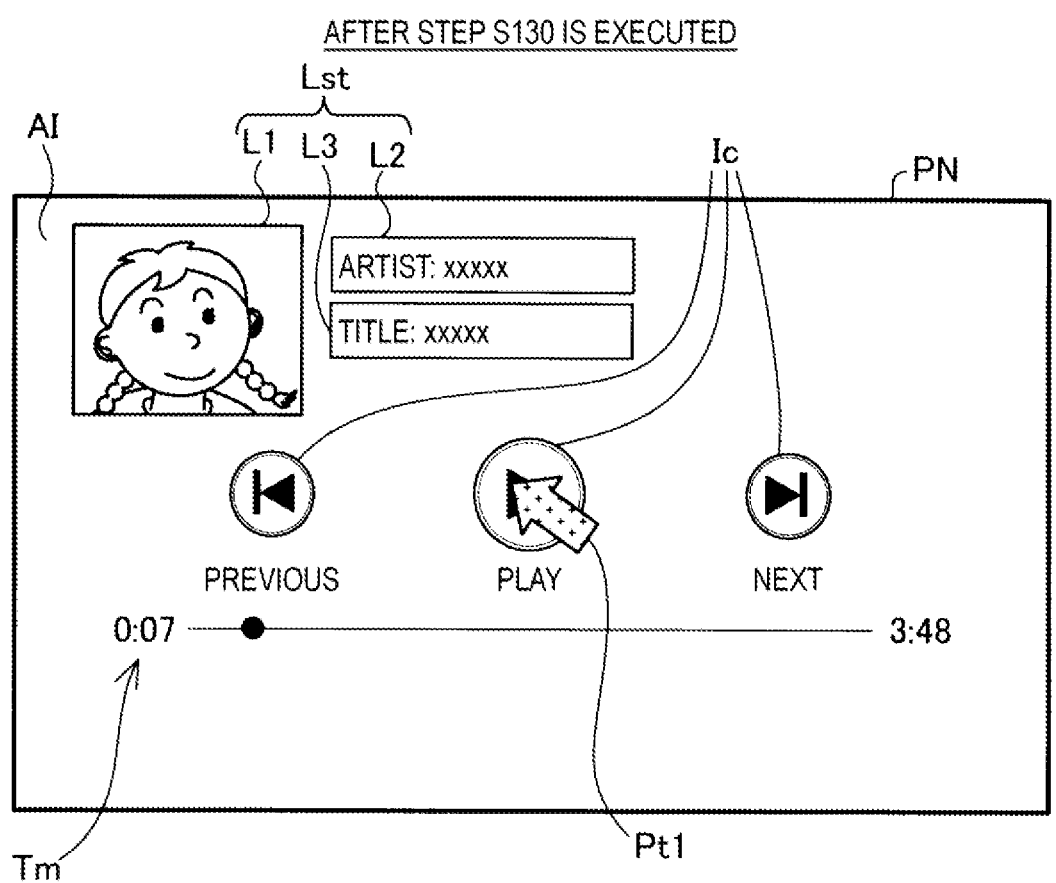
FIG. 13 is an explanatory view schematically illustrating a display region after step S130 has been executed.

FIG. 13 is an explanatory view schematically illustrating the display region PN after step S130 has been executed. In FIG. 13, for convenience of description, the external scene SC is omitted as with FIG. 12. As illustrated in FIG. 13, a pointer image Pt1 is displayed at an approximately center of the display region PN. Since step S125 described above has also been executed, the pointer image Pt1 is displayed in a different size, shape, and color from the pointer image Pt during the second display control process, as can be understood by comparison of FIG. 12 and FIG. 13. Specifically, as illustrated in FIG. 13, the pointer image Pt1 has an arrow shape and is larger than the pointer image Pt.

As illustrated in FIG. 9, following step S130, the display controller 147 executes the first display control process (Step S135).

Figure 14:
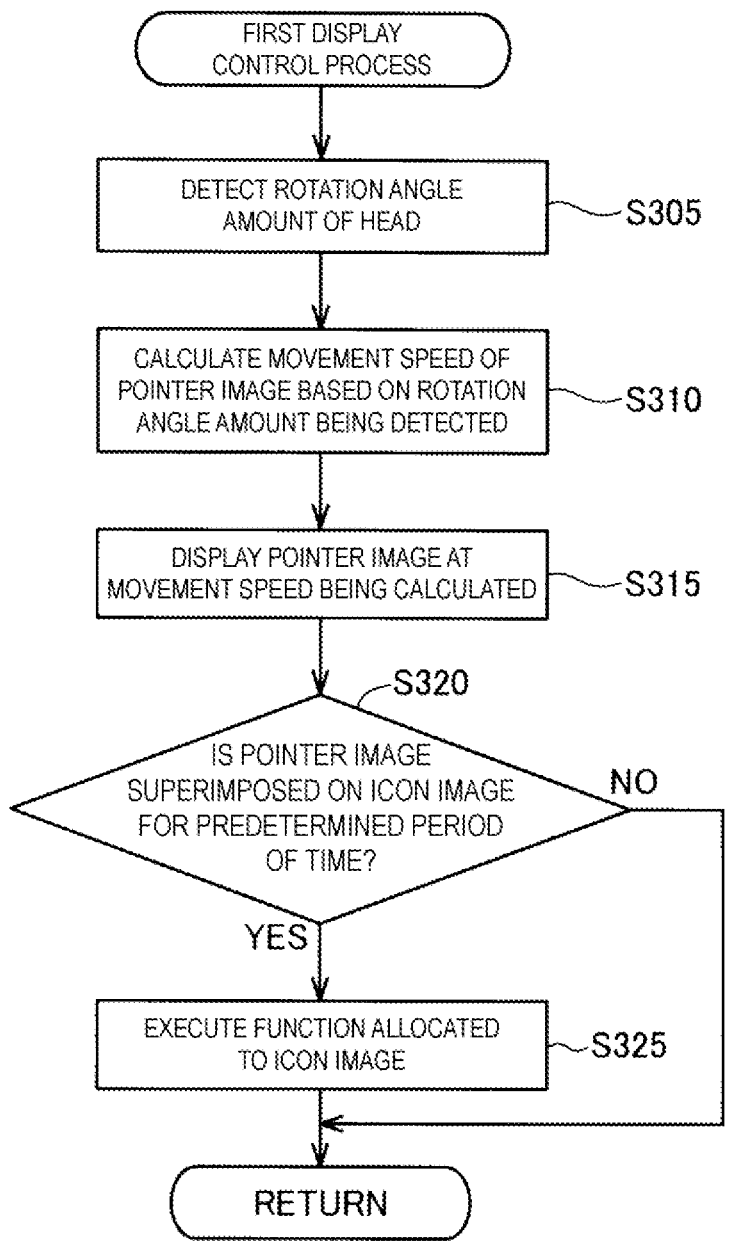
FIG. 14 is a flowchart illustrating how a first display control process proceeds.

FIG. 14 is a flowchart illustrating how the first display control process proceeds. The head movement detection unit 153 detects the amount of rotation angle of the head (Step S305).

Figure 15:
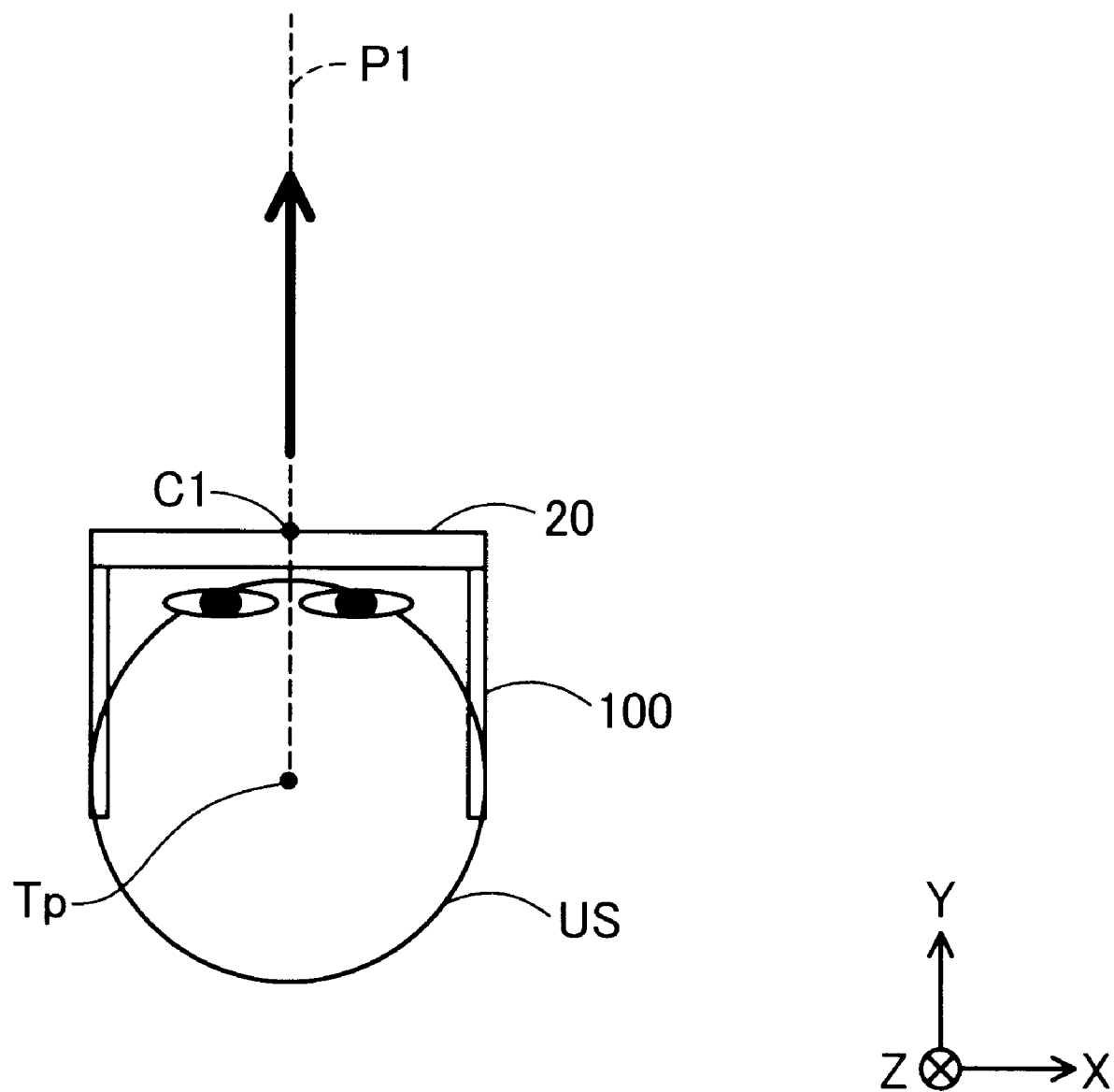
FIG. 15 is an explanatory view for describing the amount of rotation angle of the head.

FIG. 15 is an explanatory view for describing the amount of rotation angle of the head. FIG. 15 illustrates the head of the user US wearing the HMD 100, viewed from immediately above (viewed from the top of the head Tp of the user US), as the first display control process starts. In FIG. 15, the Z axis direction is parallel to the vertical direction, while the X axis and Y axis are parallel to the horizontal direction. The X axis is parallel to a left-right direction of the user US. +X and −X directions corresponds to right- and left-hand sides of the user US, respectively. The Y axis is parallel to a front-rear direction of the user US. +Y direction corresponds to a direction parallel to a direction from the image display unit 20 to the external scene. −Y direction corresponds to a direction parallel to a direction from the external scene to the image display unit 20. The above-described definitions also apply to the subsequent drawings.

As illustrated in FIG. 15, the user US has the top of the head Tp of the user US oriented parallel to an X-Y plane and facing in the +Y direction with the image display unit 20 parallel to the X axis. Therefore, the central position C1 of the image display unit 20 (display region PN) lies on a straight line P1 extending parallel to the Y axis. As described above, the reference position used when detecting the amount of rotation angle of the head is the central position of the image display unit 20 of the HMD 100 mounted on the head of the user US when the first display control process starts. Thus, as illustrated in FIG. 15, the amount of change in the central position of the image display unit 20 that occurs as the user moves his/her head about the top of the head Tp of the user US as the central axis relative to the position C1 as the reference position can be detected as the amount of rotation angle of the head. How to detect the amount of rotation angle of the head will be described with reference to FIGS. 16 and 17. The straight line P1 will be hereinafter referred to as the "reference line P1".

Figure 16:
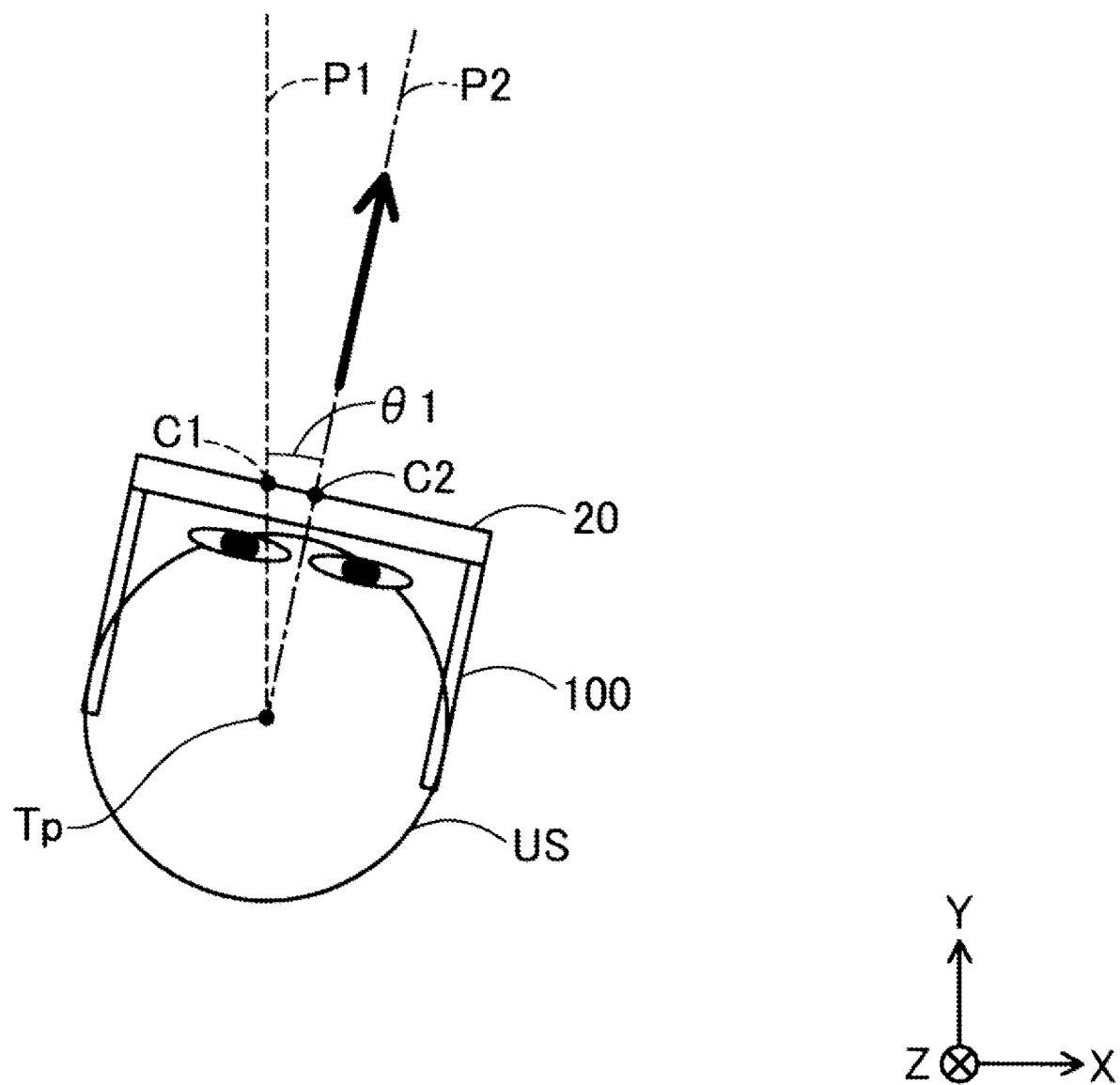
FIG. 16 is an explanatory view for describing the amount of rotation angle of the head.

FIG. 16 is an explanatory view for describing the amount of rotation angle of the head. FIG. 16 illustrates a state after the head of the user US illustrated in FIG. 15 has been turned horizontally in the right direction (+X direction) of the user US. In the example illustrated in FIG. 16, a central position C2 of the image display unit 20 is moved, compared with the reference position C1, as the head is moved in the +X direction and the −Y direction. A straight line P2 is a straight line passing through the central position C2 and parallel to the front-rear direction of the user US. In step S305 described above, the head movement detection unit 153 detects an angle θ1 between the reference line P1 and the straight line P2 as the amount of rotation angle of the head based on values of angular velocities in the X axis, the Y axis, and the Z axis detected by the six-axis sensor 235.

Figure 17:
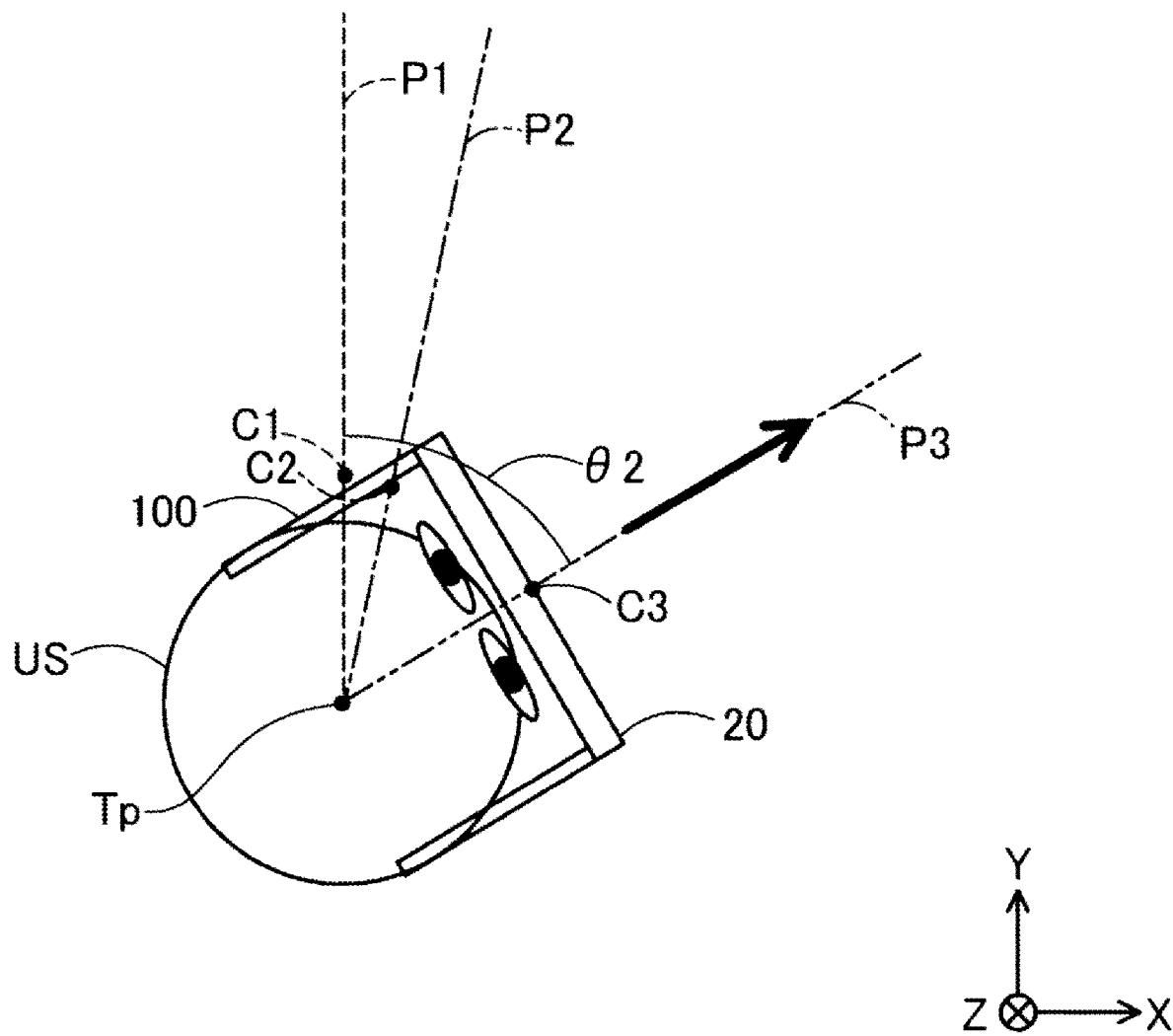
FIG. 17 is an explanatory view for describing another example of the amount of rotation angle of the head.

FIG. 17 is an explanatory view for describing another example of the amount of rotation angle of the head. FIG. 17 illustrates a state after the head of the user US illustrated in FIG. 16 has been turned horizontally further in the right direction (+X direction) of the user US. A central position C3 of the image display unit 20 is moved, compared with the reference position C1 and the position C2, as the head is moved in the +X direction and the −Y direction. A straight line P3 is a straight line passing through the central position C3 and parallel to the front-rear direction of the user US. In step S305 described above, the head movement detection unit 153 detects an angle θ2 between the reference line P1 and the straight line P3 as the amount of rotation angle of the head. The rotation angle amount θ2 is greater than the rotation angle amount θ1.

As illustrated in FIG. 14, following step S305, the display controller 147 calculates the speed of the movement of the pointer image Pt1 based on the detected amount of rotation angle (step S310). Specifically, the display controller 147 refers to a map (not illustrated) stored in the setting data 123 to acquire the movement speed stored in association with the amount of rotation angle. In the exemplary embodiment, the movement speed is set in proportion to the amount of rotation angle. Specifically, the movement speed is set such that the movement speed increases as the amount of rotation angle increases.

Following step S310, the display controller 147 displays the pointer image Pt1 at a calculated movement (Step S315).

Figure 18:
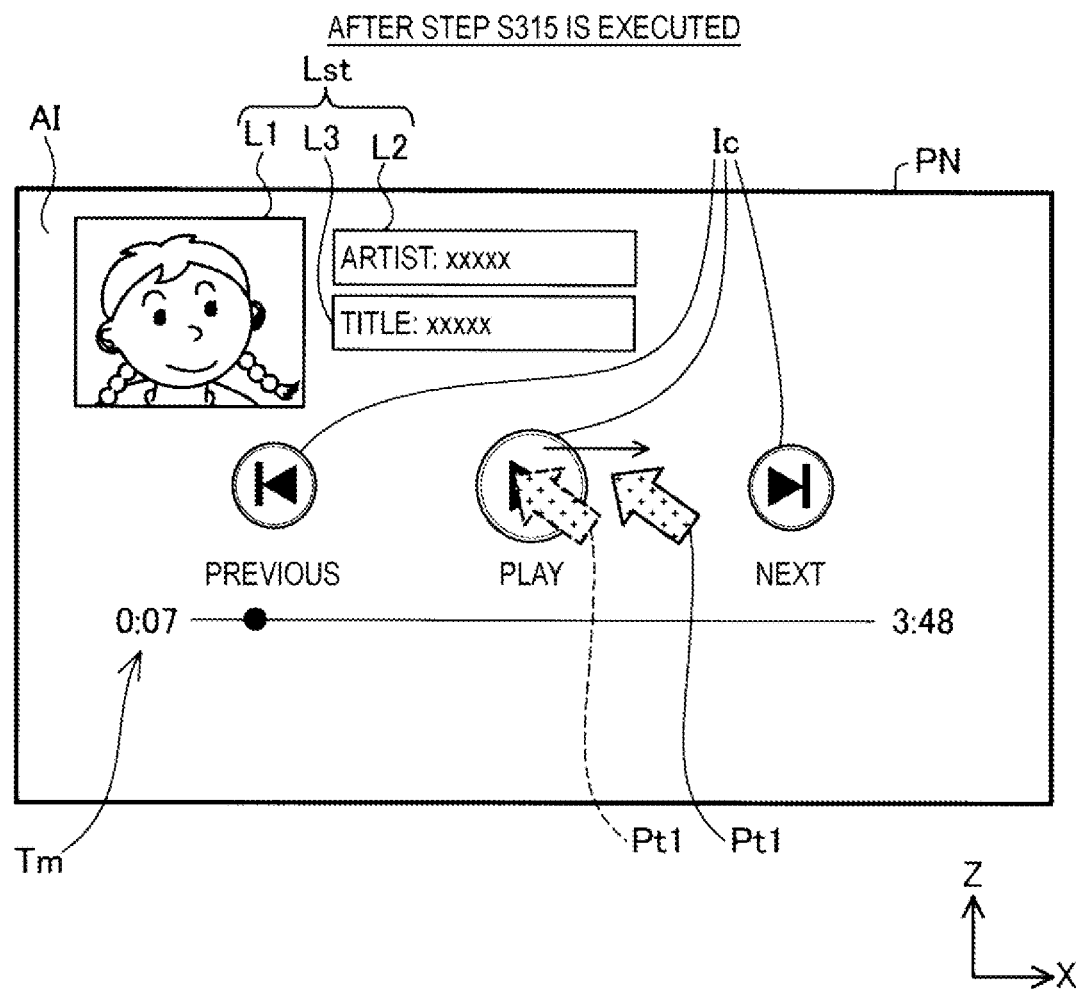
FIG. 18 is an explanatory view schematically illustrating an example of the pointer image after step S315 has been executed.
Figure 19:
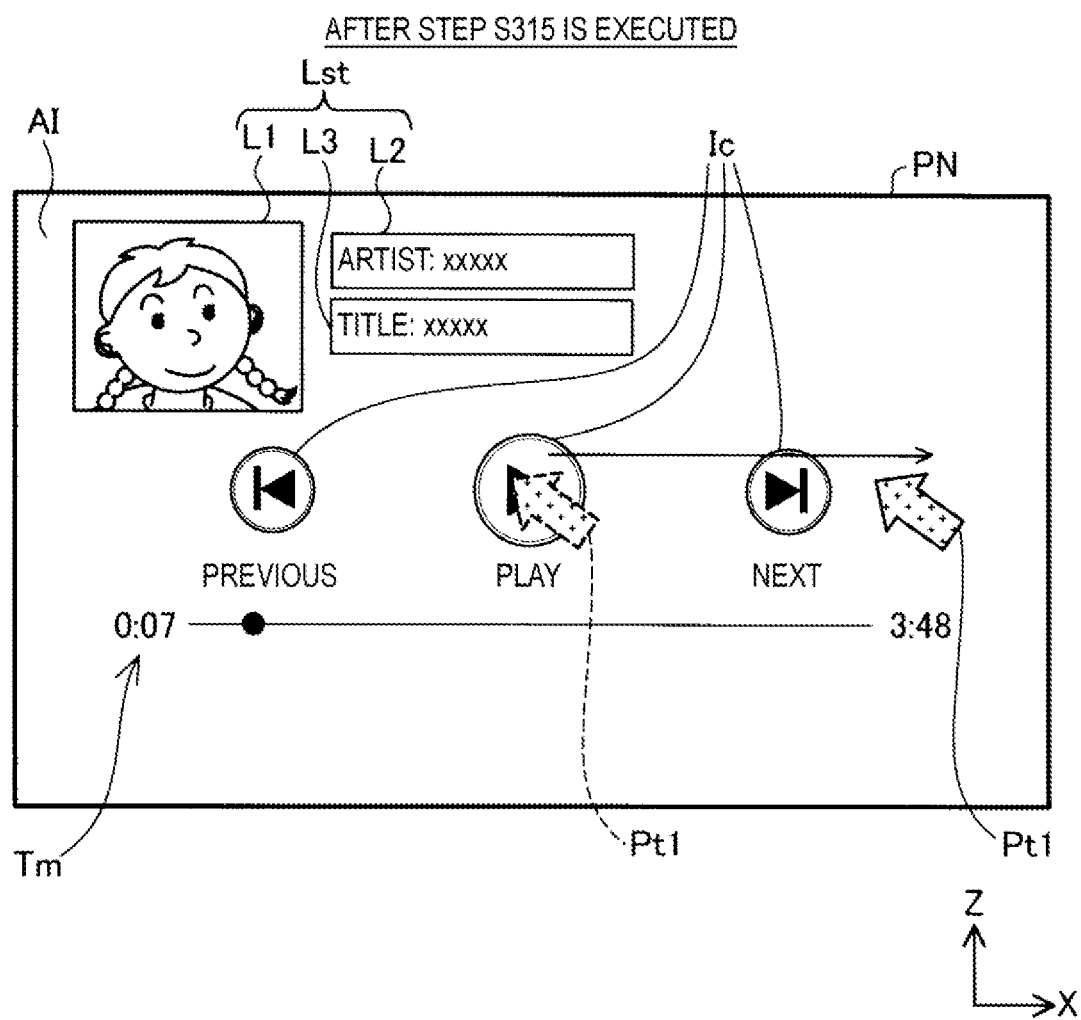
FIG. 19 is an explanatory view schematically illustrating an example of the pointer image after step S315 has been executed.

FIGS. 18 and 19 are explanatory views schematically illustrating an example of the pointer image Pt1 after step S315 has been executed. In FIGS. 18 and 19, the display region PN is schematically illustrated and the external scene SC omitted as with FIGS. 12 and 13. In FIGS. 18 and 19, the pointer image Pt1 following step S315 is indicated by a solid line while the pointer image Pt1 before step S315 is indicated by a dashed line. FIG. 18 illustrates the pointer image Pt1 when the rotation angle θ1 of the head illustrated in FIG. 16 is detected whereas FIG. 19 illustrates the pointer image Pt1 when the rotation angle θ2 of the head illustrated in FIG. 17 is detected.

As illustrated in FIGS. 18 and 19, the displayed pointer image Pt1 following step S315 differs in position from the pointer image Pt1 before step S315 in that it has been moved to a position in the rotation direction of the head, i.e., the +X direction. Upon this, the pointer image Pt1 is displayed such that a greater amount of rotation angle detected results in a greater movement speed. Thus, as can be understood by comparing FIGS. 16 and 18 with FIGS. 17 and 19, respectively, the pointer image Pt1 can be displayed at a position farther in the +X direction when an amount of rotation angle θ2 greater than the amount of rotation angle θ1 is detected. In this manner, the user US can move the displayed pointer image Pt1 at a greater speed by turning his/her head by a greater amount.

As illustrated in FIG. 14, following step S315, the display controller 147 determines whether the pointer image Pt1 is overlaid on any of the operation icon images Ic for a predetermined period of time (step S320). In the exemplary embodiment, the "predetermined period of time" is two seconds. It is to be understood that the predetermined period of time may be any desired period of time, rather than two seconds. If it is determined that the pointer image Pt1 is overlaid on one of the operation icon images Ic (Step S320: YES), then the display controller 147 executes a function assigned to the one of the operation icon images Ic (Step S325).

Figure 20:
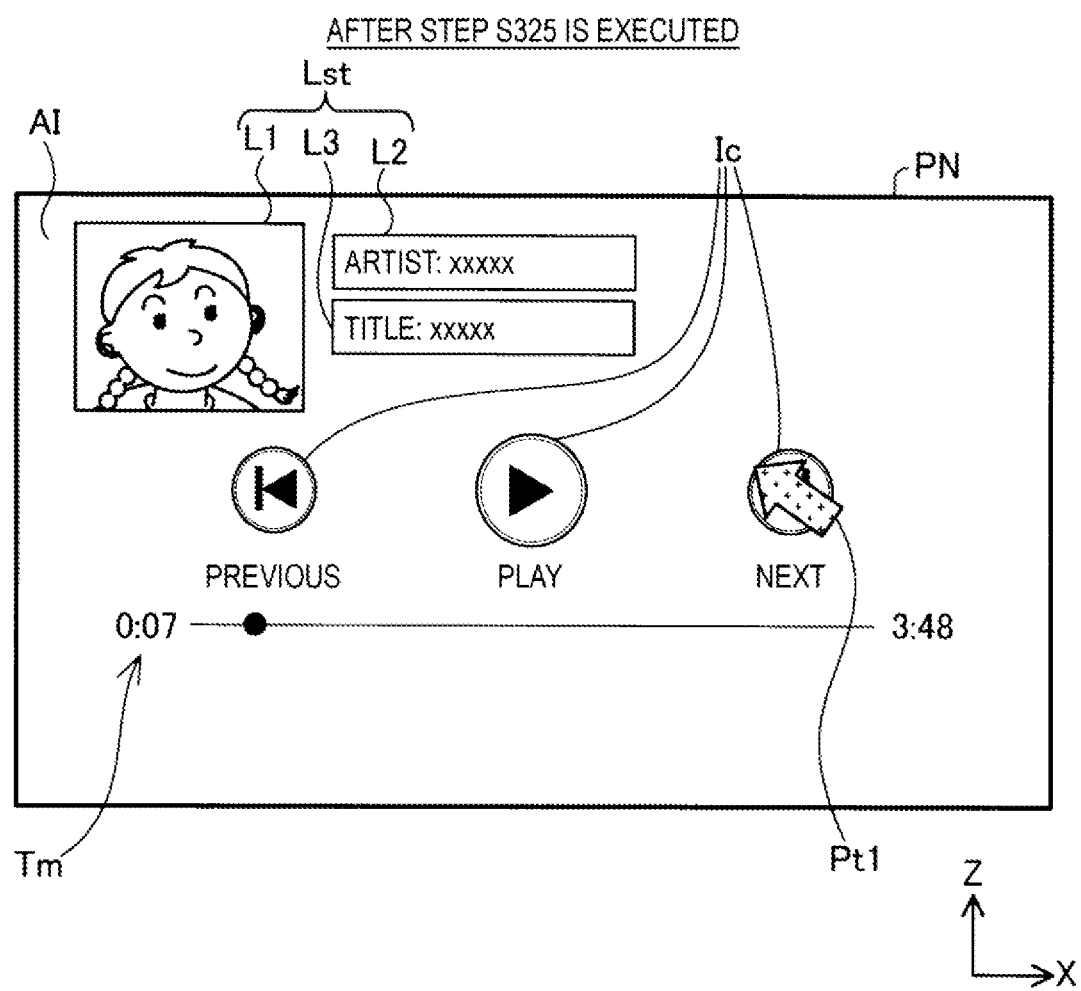
FIG. 20 is an explanatory view schematically illustrating an example of the pointer image when step S325 is executed.

FIG. 20 is an explanatory view schematically illustrating an example of the pointer image Pt1 when step S325 is executed. In FIG. 20, the display region PN within the field of view VR of the user US is schematically illustrated and the external scene SC is omitted as with FIGS. 18 and 19. In the example illustrated in FIG. 20, the pointer image Pt1 is displayed as being overlaid on one of the operation icon images Ic indicating "Next". If the displayed state continues for a predetermined period of time, then it is determined that the "Enter" operation has been made, such that the display controller 147 executes the function assigned to the operation icon image indicating "Next".

As illustrated in FIG. 14, if it is determined that the pointer image Pt1 is not overlaid on any of the operation icon images Ic for the predetermined period of time in step S320 described above (Step S320: NO), or after step S325 described above has been executed, then step S140 illustrated in FIG. 9 is executed.

As illustrated in FIG. 9, the operation detection unit 155 determines whether the second operation entry has been made (Step S140). Specifically, the operation detection unit 155 determine whether the second operation entry has been made by detecting that the input and output controller 151 has received an entry from the control device 10.

If it is determined that the second operation entry has not been made (Step S140: NO), then the flow returns to step S135 described above and steps S135 and S140 described above are repeated. On the other hand, if it is determined that the second operation entry has been made (Step S140: YES), as illustrated in FIG. 10, then the display controller 147 reverts the size, shape and color of the pointer image Pt1 to the size, the shape, and the color before change (Step S145).

Following step S145, the display controller 147 displays the pointer image Pt at the position of the pointer image Pt displayed after switching from the second display control process to the first display control process has taken place (Step S150). That is, the display controller 147 reverts the display position of the pointer image Pt to the display position of the pointer image Pt while the second display control process was executed and displays the pointer image Pt. Specifically, the pointer image Pt is displayed at the display position of the pointer image Pt stored in step S115 described above. As described above, by reverting the display position of the pointer image Pt to the display position of the pointer image Pt when the second display control process was executed and displaying the pointer image Pt, the user US can readily recognize that switching from the first display control process to the second display control process has taken place. As well as the pointer image Pt may be controlled by taking over a state when the second display control process was executed before the first display control process was executed.

As illustrated in FIGS. 9 and 10, following step S150, steps S105 to S150 described above are repeated.

As has been described above, according to the HMD 100 of the exemplary embodiment, a first display control process can be executed by which the amount of rotation angle of the head of the user US is detected and the pointer image Pt1 is displayed at a movement speed changed in accordance with the detected amount of rotation angle. As a result, the display mode of the pointer image Pt1 can be controlled in accordance with the amount of rotation angle of the head. Therefore, the user US can control the HMD 100 without holding the control device 10 in hand, minimizing a decrease in convenience for the user US.

The display controller 147 executes the first display control process if the first operation entry is detected, so that the first display control process can be executed based on the intention of the user US. As a result, operation failures are minimized. In addition, the display controller 147 executes the first display control process if the first operation entry is detected and, if the first display control process is not executed, executes the second display control process by which the display mode of the pointer image Pt is controlled in response to the second operation entry being received. This allows the user US to selectively control the display mode of the pointer image Pt utilizing the control device 10 or control the display mode of the pointer image Pt1 based on the rotation of the head. Consequently, a decrease in convenience for the user US can be minimized.

Further, the display controller 147 displays the pointer image Pt1 at the center of the display region PN when the second display control process is switched to the first display control process. This facilitates the user US recognizing the pointer image Pt1 during the first display control process. In addition, the display controller 147 displays the pointer image Pt at the display position of the pointer image Pt upon switching from the stored second display control process to the first display control process when the first display control process is switched to the second display control process. This enables the user US to readily recognize that switching from the first display control process to the second display control process has taken place. As a result, operation failures are minimized. Furthermore, control of the pointer image Pt during the second display control process can be executed again from a state before switching from the second display control process to the first display control process took place. Consequently, decrease in convenience for the user US can be minimized.

In addition, the display controller 147 displays the pointer image by changing the size, the shape, and the color of the pointer image between the pointer image Pt during the second display control process and the pointer image Pt1 during the first display control process. This enables the user US to readily recognize which of the first display control process and the second display control process is being executed. As a result, decrease in convenience for the user US can be minimized.

B. Other Exemplary Embodiments

B1. Exemplary Embodiment 1

In the first exemplary embodiment described above, a movement speed of the pointer image Pt1 increases in proportion to the amount of rotation angle of the head. However, the invention is not limited to the exemplary embodiment. For example, the speed may increase stepwise for each of predetermined amounts of rotation angle. Specifically, the amount of increase in the speed may be predetermined for each of the predetermined amounts of rotation, so that the movement speed can be increased by one step as the amount of rotation angle changes by one step.

Figure 21:
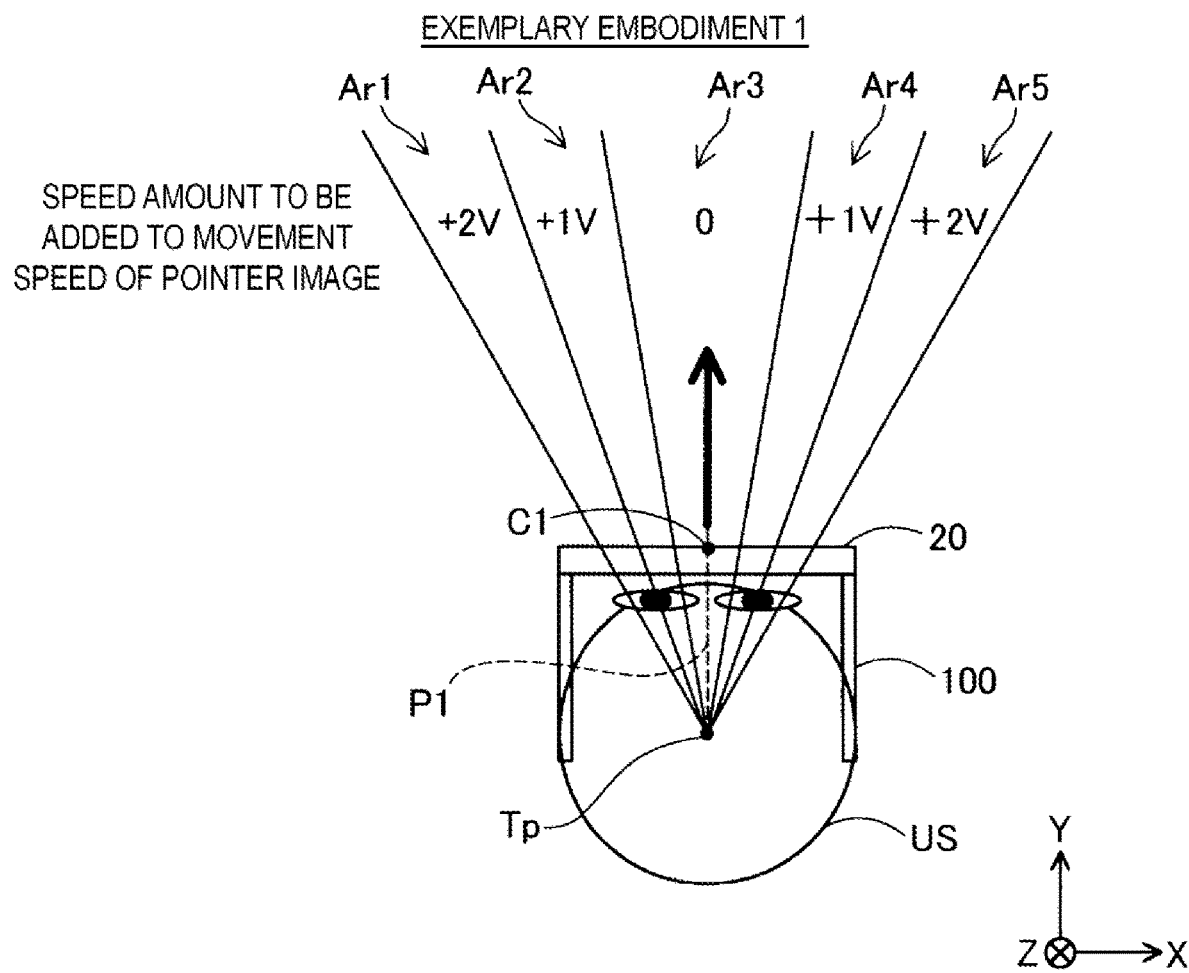
FIG. 21 is an explanatory view schematically illustrating a correspondence relationship between the amount of rotation angle of the head and the movement speed of the pointer image according to Exemplary Embodiment 1.

FIG. 21 is an explanatory view schematically illustrating a correspondence relationship between the amount of rotation angle of the head and the movement speed of the pointer image Pt1 according to Exemplary Embodiment 1. FIG. 21 illustrates areas Ar1 to Ar5 predetermined for each of the predetermined amounts of rotation angle of the head, along with the respective amounts of speed assigned to the respective areas Ar1 to Ar5 that are to be added to the movement speed of the pointer image Pt1.

As illustrated in FIG. 21, the area Ar1 represents an area over which the user US moves his/her head to the left (in −X direction) from the reference position C1 by a predetermined range of angle. The area Ar2 represents an area over which the user US moves his/her head to the left (in −X direction) from the reference position C1 by a predetermined range of angle smaller than the amount of rotation angle for the area Ar1. The area Ar3 represents an area over which the user US moves his/her head to the left (in −X direction) or to the right (in +X direction) from the reference position C1 by a predetermined range of angle. The area Ar4 represents an area over which the user US moves his/her head to the right (in +X direction) from the reference position C1 by a predetermined range of angle. The area Ar5 represents an area over which the user US moves his/her head to the right (in +X direction) from the reference position C1 by a predetermined range of angle greater than the amount of rotation angle for the area Ar4.

The amount of speed to be added to the movement speed of the pointer image Pt1 is set for each of the areas Ar1 to Ar5. In the exemplary embodiment, the term "amount of speed to be added to the movement speed of the pointer image Pt1" denotes a unit speed (V) to be added to or subtracted from the current movement speed of the pointer image Pt1. The unit speed (V) is calculated beforehand through experiments. As illustrated in FIG. 21, the amount of speed to be added to the movement speed of the pointer image Pt1 is set to +2 V in the areas Ar1 and Ar5. In other words, the movement speed in the area Ar1 is determined by adding to the current movement speed a speed that is twice the unit speed in the −X direction. The movement speed in the area Ar5 is determined by adding to the current movement speed a speed that is twice the unit speed in the +X direction. In each of the areas Ar2 and Ar4, the amount of speed to be added to the movement speed of the pointer image Pt1 is set to +1 V. In other words, the movement speed in the area Ar2 is determined by adding to the current movement speed the unit speed in the −X direction. The movement speed in the area Ar4 is determined by adding to the current movement speed the unit speed in the +X direction. In the area Ar3, the amount of speed to be added to the movement speed of the pointer image Pt1 is set to 0. In other words, the pointer image Pt1 comes to rest. In this manner, the movement speed of the pointer image Pt1 may be increased stepwise for each predetermined amount of angle. The amounts of speed set for the areas Ar1 to Ar5 to be added to the movement speed of the pointer image Pt1 are not limited to the examples described above. For example, the amount of speed to be added to a movement speed in each of the areas Ar1 and Ar5 may not be twice the unit speed, and any desired amount of speed may be added to the movement speed.

In addition, the movement speed of the pointer image Pt1 may be reduced, for example, when the user first turns the head and then returns the head to the original position (reference position C1). Alternatively, the movement speed may be set in accordance with the length of time over which the user turns his/her head. In such a configuration, the length of time over which the head is turned may be measured and the pointer image Pt1 may be moved only during the measured length of time. In other words, a configuration in which the pointer image Pt1 is displayed at a varying movement speed in accordance with the detected amount of rotation angle of the head can provide advantages similar to the exemplary embodiments described above.

B2. Exemplary Embodiment 2

In the exemplary embodiments described above, the reference position C1 is always the central position of the image display unit 20 when the first display control process starts. However, the invention is not limited to the exemplary embodiments. For example, when the user turns the head to move the pointer image Pt1, the reference position may be shifted to the central position of the moved image display unit 20. Even in such a configuration, advantages similar to the exemplary embodiments described above may be achieved.

B3. Exemplary Embodiment 3

In the first exemplary embodiment described above, the "Enter" operation in the first display control process is an operation of overlaying the pointer image Pt1 on one of the operation icon images Ic for a predetermined period of time. However, the invention is not limited to the exemplary embodiment.

Figure 22:
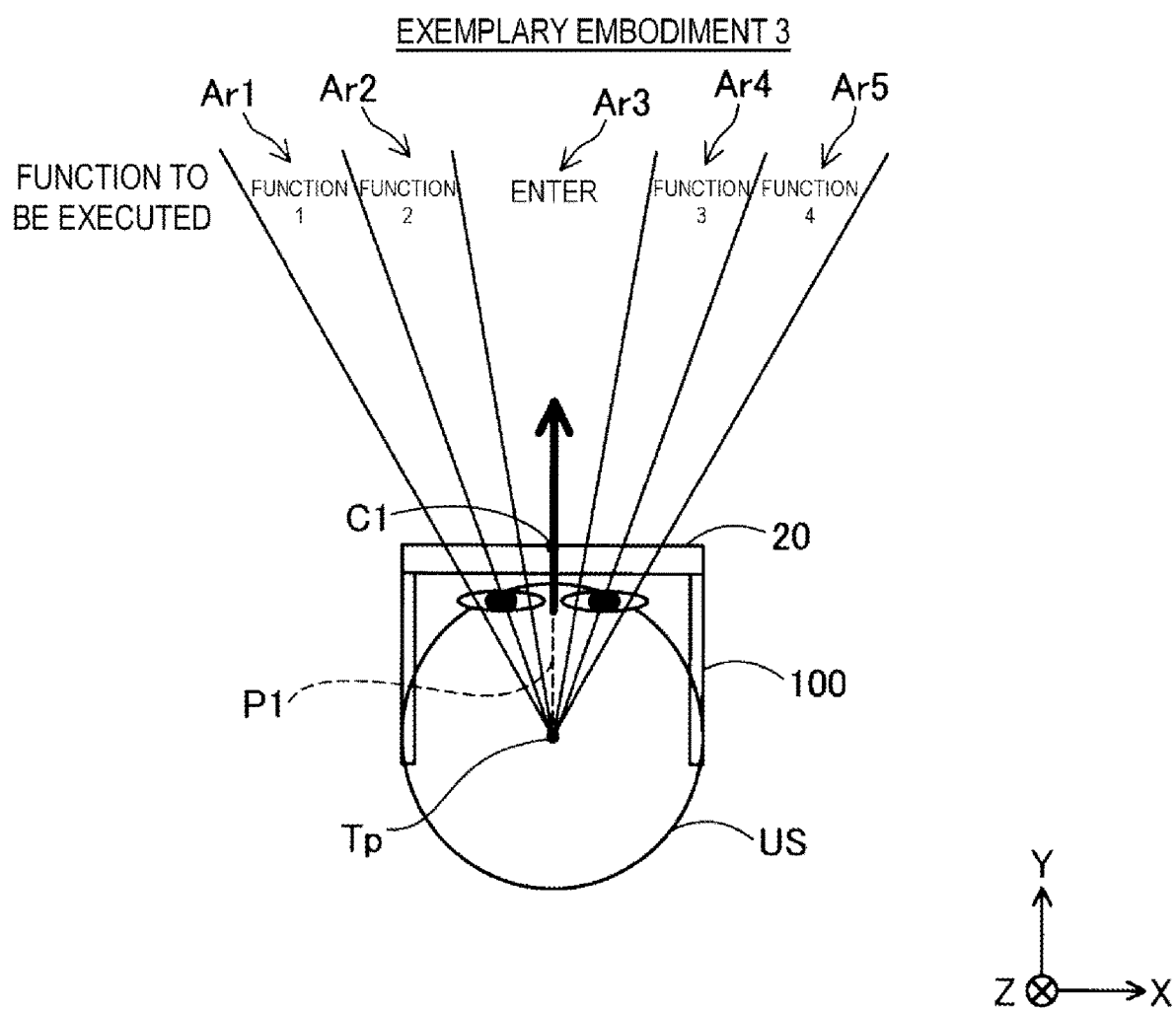
FIG. 22 is an explanatory view schematically illustrating an example of an "Enter" operation, according to Exemplary Embodiment 3.
Figure 23:
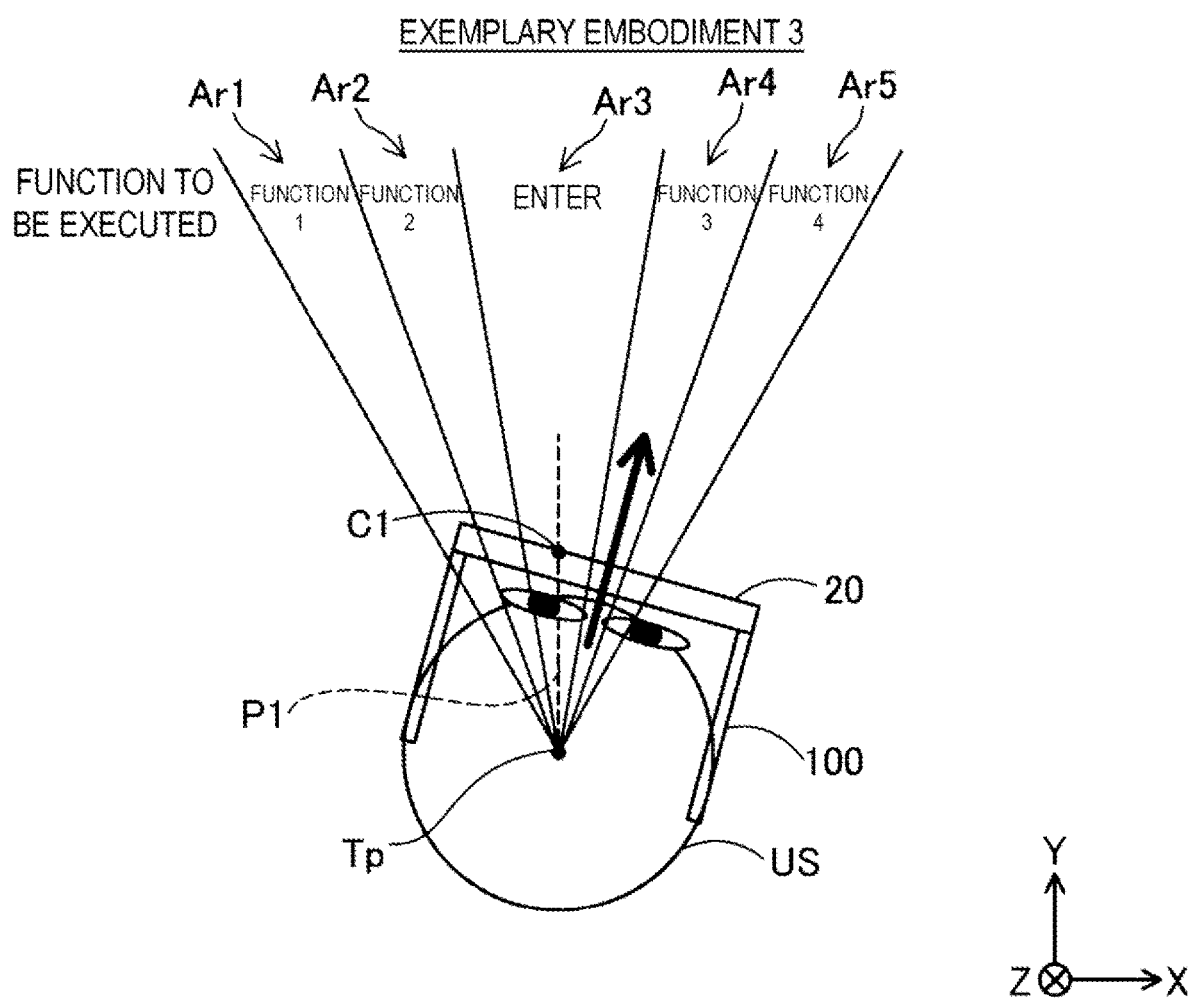
FIG. 23 is an explanatory view schematically illustrating an example of the "Enter" operation, according to Exemplary Embodiment 3.

FIGS. 22 and 23 are explanatory views schematically illustrating an example of the "Enter" operation according to Exemplary Embodiment 3. Areas Ar1 to Ar5 illustrated in FIGS. 22 and 23 are identical to the areas Ar1 to Ar5 illustrated in FIG. 21. In Exemplary Embodiment 4, a different function to be executed is preassigned for each of the predetermined amounts of rotation angle (i.e., each of the areas Ar1 to Ar5). Specifically, as illustrated in FIG. 22, a function 1 is assigned to the area Ar1. A function 2 is assigned to the area Ar2; "Enter" is assigned to the area Ar3; a function 3 is assigned to the area Ar4; and a function 4 is assigned to the area Ar5.

In Exemplary Embodiment 3, when the user US intends to execute a desired function, the user US can turn his/her head from the reference position C1 by a predetermined amount of rotation angle and then return the head back to the reference position C1 to execute the desired function preassigned to one of the predetermined amounts of rotation angle. For example, as illustrated in FIG. 23, when the user US intends to execute the function 3, the user US turns his/her head to the right (+X direction) of the user US by a predetermined amount of rotation angle so that the central position of the image display unit 20 (display region PN) lies within the area Ar4 assigned with the function 3. Subsequently, the user US turns his/her head to the left (−X direction) as illustrated in FIG. 22 so that the central position of the image display unit 20 (display region PN) returns to the reference position C1. By moving the head in a manner described above, the user can execute the function 3 assigned to the area Ar4. As described above, a function assigned to a predetermined angle may be executed after the head has been turned from the reference position C1 to a predetermined angle assigned with an executable function and subsequently returned to the reference position C1. Such a configuration also provides advantages similar to the first exemplary embodiment described above.

B4. Exemplary Embodiment 4

Figure 24:
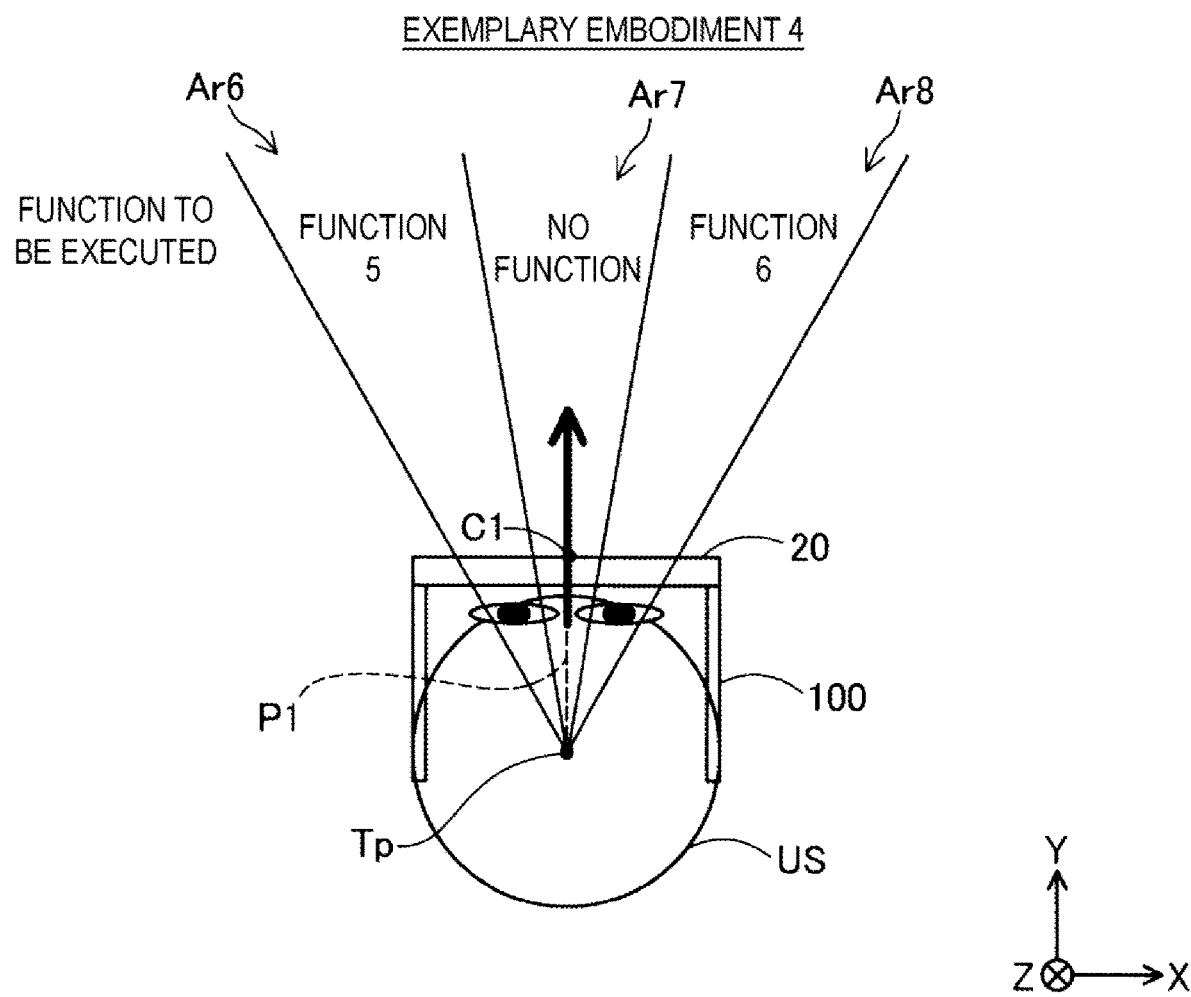
FIG. 24 is an explanatory view schematically illustrating another example of the "Enter" operation, according to Exemplary Embodiment 4.

FIG. 24 is an explanatory view schematically illustrating another example of the "Enter" operation according to Exemplary Embodiment 4. As in FIGS. 22 and 23, FIG. 24 illustrates areas Ar6 to Ar8 corresponding to respective amounts of rotation angle of the head and functions preassigned to the respective areas Ar1 to Ar5. Specifically, as illustrated in FIG. 24, the area Ar6 represents an area over which the user US moves his/her head to the left (in −X direction) from the reference position C1 by a predetermined range of angle. The area Ar7 represents an area over which the user US moves his/her head to the left (in −X direction) or to the right (in +X direction) from the reference position C1 by a predetermined range of angle. The area Ar8 represents an area over which the user US moves his/her head to the right (in +X direction) from the reference position C1 by a predetermined range of angle.

As in Exemplary Embodiment 3, a different function to be executed is preassigned to each of the predetermined amounts of rotation angle (i.e., each of the areas Ar6 to Ar8) in Exemplary Embodiment 4.

When the user US intends to execute a desired function, the user US can turn his/her head from the reference position C1 by a predetermined amount of rotation angle to execute the desired function preassigned to one of the predetermined amounts of rotation angle. For example, when the user US intends to execute the function 5, the user US turns his/her head to the left (−X direction) of the user US by a predetermined amount of rotation angle so that the central position of the image display unit 20 (display region PN) lies within the area Ar6 assigned with the function 5. For example, when the user US intends to execute the function 3, the user US turns his/her head to the right (+X direction) of the user US by a predetermined amount of rotation angle so that the central position of the image display unit 20 (display region PN) lies within the area Ar8 assigned with the function 6. As described above, a function assigned to a predetermined angle may be executed after the head has been turned from the reference position C1 to a predetermined angle assigned with an executable function. Such a configuration also provides advantages similar to the first exemplary embodiment and Exemplary Embodiment 3 described above.

B5. Exemplary Embodiment 5

In the exemplary embodiments described above, the pointer image Pt1 is displayed at the center of the display region PN when the first display control process starts. However, the invention is not limited to the exemplary embodiments. For example, the pointer image Pt1 may be displayed at an identical position to a position when the pointer image Pt was displayed during the second display control process. For example, the pointer image Pt1 may be displayed at a predetermined position other than the center of the display region PN, such as a top-left corner. Such a configuration also provides advantages similar to the exemplary embodiments described above.

B6. Exemplary Embodiment 6

In the exemplary embodiments described above, the display position of the pointer image Pt when switching from the second display control process to the first display control process takes place is reverted to the display position of the pointer image Pt when switching from the second display control process to the first display control process took place. However, the invention is not limited to the exemplary embodiments. For example, the pointer image Pt1 may be displayed at an identical position to a position when the pointer image Pt1 was displayed during the second display control process. For example, the pointer image Pt1 may be displayed at the center of the display region PN. For example, the pointer image Pt1 may be displayed at a predetermined position other than the center of the display region PN, such as a top-left corner. Such a configuration also provides advantages similar to the exemplary embodiments described above.

B7. Exemplary Embodiment 7

In the exemplary embodiments described above, when switching from the first display control process to the second display control process takes place, the pointer image Pt is displayed by changing the size, shape, and color. However, the invention is not limited to the exemplary embodiments. For example, in a configuration where the pointer image Pt has a pattern, the pattern may be changed. For example, only the size of the pointer image Pt may be changed or only the shape may be changed. In other words, a configuration may be conceived of in which the pointer image Pt is different in at least one of the size, shape, pattern, and color between the first display control process and the second display control process. For example, the size, the shape, the pattern, and the color of the pointer image Pt may not be changed. Such a configuration also provides advantages similar to the exemplary embodiments described above.

B8. Exemplary Embodiment 8

In the exemplary embodiments described above, the pointer image Pt may be displayed by changing brightness between the first display control process and the second display control process. Specifically, the pointer image Pt1 during the first display control process may be displayed with a brightness higher than the brightness of the pointer image Pt during the second display control process. In such a configuration, in addition to the pointer image Pt1, the object image AI or the operation icon images Ic in the object image AI may be displayed with a higher brightness during the first display control process. Such a configuration also provides advantages similar to the exemplary embodiments described above.

B9. Exemplary Embodiment 9

While the pointer image display control process starts upon activation of the "Music" application in the exemplary embodiments described above, the invention is not limited to such exemplary embodiments. For example, the pointer image display control process may start upon activation of any desired application other than "Music". For example, the pointer image display control process may start as the power switch 18 of the control device 10 is turned on. Such a configuration also provides advantages similar to the exemplary embodiments described above.

B10. Exemplary Embodiment 10

In the pointer image display control process in the exemplary embodiments described above, the first display control process and the second display control process are both executed. However, the invention is not limited to the exemplary embodiments. For example, only the first display control process may be executed. Such a configuration also provides advantages similar to the exemplary embodiments described above.

B11. Exemplary Embodiment 11

While the first operation entry is knocking on the HMD 100 a predetermined number of times in the exemplary embodiments described above, the invention is not limited to the exemplary embodiments. For example, the first operation entry may be an entry of predetermined sound by the user US. Such a configuration also provides advantages similar to the exemplary embodiments described above.

B12. Exemplary Embodiment 12

In the first exemplary embodiment described above, the "Enter" operation in the first display control process is an operation of overlaying the pointer image Pt1 on one of the operation icon images Ic for a predetermined period of time. However, the invention is not limited to the exemplary embodiment. For example, the "Enter" operation may be knocking on the HMD 100. In such a configuration, the "Enter" operation may be detection of knocking on the HMD 100 a number of times that is different from the number of knocking for the first operation entry. Alternatively, the "Enter" operation may be detection of direction of knocking different from the direction of the knocking for the first operation entry. For example, the "Enter" operation may be detection of the head being moved in the horizontal direction by a predetermined angle or greater. In such a configuration, the "Enter" operation may be the head remaining still for a predetermined period of time after movement of the head. For example, the "Enter" operation may be an entry of predetermined sound by the user US. For example, the "Enter" operation may be movement of the head, followed by returning of the head to the position where the first display control process has started. Such a configuration also provides advantages similar to the first exemplary embodiment described above.

B13. Exemplary Embodiment 13

In the exemplary embodiments described above, the user US turns the head in the horizontal direction. However, the invention is not limited to the exemplary embodiments. For example, the user US may turn the head in the vertical direction or alternatively, the user may turn the head in a direction intersecting in the horizontal direction and the vertical direction. Also, the user US may turn his/her head while lying down on his/her side or on his/her back, for example. Since the six-axis sensor 235 detects angular velocities relative to the X axis, the Y axis and the Z axis, such a configuration also allows the pointer image Pt1 to be displayed at a varying movement speed in accordance with the detected amount of rotation angle of the head.

B14. Exemplary Embodiment 14

In the exemplary embodiments described above, the HMD 100 is a transmission-type head-mounted display apparatus. However, the invention is not limited to the exemplary embodiments. For example, the HMD 100 may be a video see-through type HMD or a non-transmission-type head-mounted display apparatus. Such a configuration also provides advantages similar to the exemplary embodiments described above.

B15. Exemplary Embodiment 15

In the exemplary embodiments described above, the object image AI is displayed in an identical size during the first display control process and the second display control process. However, the invention is not limited to the exemplary embodiments. For example, the object image AI may be displayed by changing its size between the first display control process and the second display control process. For example, the operation icon images Ic in the object image AI may be displayed by changing its size between the first display control process and the second display control process. In such a configuration, the pointer image Pt1 can be easily overlaid on one of the operation icon images Ic, for example, by displaying the operation icon images Ic during the first display control process in a larger size than the operation icon images Ic displayed during the second display control process. Such a configuration also provides advantages similar to the exemplary embodiments described above.

B16. Exemplary Embodiment 16

In the exemplary embodiments described above, one of the first display control processes according to the first exemplary embodiment, Exemplary Embodiment 1, Exemplary Embodiment 3, and Exemplary Embodiment 4 may be executed in association with a function, a menu item, and the like invoked by an application. In other words, a first display control process in a mode that differs for each of the functions, menu items, and the like invoked by an application may be executed. Such a configuration also provides advantages similar to the exemplary embodiments described above.

B17. Exemplary Embodiment 17

In the exemplary embodiments described above, the input and output controller 151 receives entries including a tap operation onto the track pad 14 of the control device 10. However, the invention is not limited to the exemplary embodiments. For example, the input and output controller 151 may receive an entry from an external input device other than the control device 10. Specifically, the input and output controller 151 may receive an entry from an input device, such as a personal computer, a smart phone and a game device, having an operation face, such as a track pad and a touch panel. In a configuration where an entry from an input device having a touch panel is received, the brightness of the touch panel (operation face) may be lowered, the touch panel (operation face) may be turned off, or the input and output controller 151 may not receive any entry from the touch panel (operation face) during execution of the first display control process. Such an external input device and the control device 10 may be coupled in a wired manner, or may be coupled in a wireless manner by performing wireless communications conforming to a standard, such as wireless LAN. Such a configuration also provides advantages similar to the exemplary embodiments described above.

B18. Exemplary Embodiment 18

In Exemplary Embodiment 1 described above, the pointer image Pt1 remains still in a case where the amount of speed to be added to the movement speed of the pointer image Pt1 is set to zero. However, the invention is not limited to the exemplary embodiment. For example, the movement speed of the pointer image Pt1 may be set to a speed identical to the current movement speed when the amount of speed to be added to the movement speed of the pointer image Pt1 is set to zero. Such a configuration also provides advantages similar to the other exemplary embodiments described above.

The invention is not limited to the exemplary embodiments described above. Rather, the invention can be achieved in various configurations, to an extent that such configurations fall within the scope of the invention. For example, technical features of the exemplary embodiments, which correspond to the technical features of the embodiments described in the summary of the invention, may be appropriately replaced or combined to address some or all of the above-identified problems or to achieve some or all of the above-described advantages. When one of the technical features is not described as essential in the description, the one of the technical features may be appropriately deleted.

The present application is based on and claims priority from JP Application Serial Number 2017-210263, filed Oct. 31, 2017, the disclosure of which is hereby incorporated by reference herein in its entirety.

What is claimed is:

1. A head-mounted display apparatus comprising:
an optical system configured to display a display object image and a pointer image; and
a processor programmed to
detect an amount of rotation angle of a head of a user;
control a display mode of the pointer image, including a movement speed of the pointer image, within a display region of the optical system,
detect a first operation entry representing a predetermined operation entry by the user onto the head-mounted display apparatus, and
receive a second operation entry representing an entry from an input device coupled to the head-mounted display apparatus,
wherein the processor executes a first display control in response to detecting the first operation entry, the first display control being configured to change the movement speed of the pointer image in accordance with the detected amount of rotation angle to display the pointer image, and
the processor executes a second display control in response to receiving the second operation entry, the second display control being configured to control the display mode of the pointer image only in accordance with the received second operation entry and not in accordance with the detected amount of rotation angle, wherein the second display control does not change the movement speed of the pointer image.

2. The head-mounted display apparatus according to claim 1, wherein
the processor displays the pointer image at a center of the display region when the second display control is switched to the first display control.

3. The head-mounted display apparatus according to claim 1, further comprising
a memory configured to store a display position of the pointer image when the second display control is switched to the first display control,
wherein the processor displays the pointer image at the stored display position when the first display control is switched to the second display control.

4. The head-mounted display apparatus according to claim 1, wherein
the processor changes at least one of a size, a shape, a pattern, and a color of the pointer image in response to switching between the first display control and the second display control.

5. A display control method for a head-mounted display apparatus including an optical system configured to display a display object image and a pointer image, the method comprising:
detecting an amount of rotation angle of a head of a user;
controlling a display mode of the pointer image, including a movement speed of the pointer image, within a display region of the optical system;
detecting a first operation entry representing a predetermined operation entry by the user onto the head-mounted display apparatus; and
receiving a second operation entry representing an entry from an input device coupled to the head-mounted display apparatus,
wherein the controlling of the display mode includes
executing a first display control in response to detecting the first operation entry, the first display control being configured to change the movement speed of the pointer image in accordance with the detected amount of rotation angle so as to display the pointer image, and
executing a second display control in response to receiving the second operation entry, the second display control being configured to control the display mode of the pointer image only in accordance with the received second operation entry and not in accordance with the detected amount of rotation angle, wherein the second display control does not change the movement speed of the pointer image.

6. A non-transitory computer readable medium storing a computer program for providing display control in a head-mounted display apparatus having an optical system configured to display a display object image and a pointer image, the computer program being configured to cause a computer to perform:
a function of detecting an amount of rotation angle of a head of a user;
a function of controlling a display mode, including a movement speed of the pointer image, within a display region of the optical system;
a function of detecting a first operation entry representing a predetermined operation entry by the user onto the head-mounted display apparatus; and
a function of receiving a second operation entry representing an entry from an input device coupled to the head-mounted display apparatus,
wherein the function of controlling the display mode includes
a function of executing a first display control in response to detecting the first operation entry, the first display control being configured to change the movement speed of the pointer image in accordance with the detected amount of rotation angle to display the pointer image, and a function of executing a second display control in response to receiving the second operation entry, the second display control being configured to control the display mode of the pointer image only in accordance with the received second operation entry and not in accordance with the detected amount of rotation angle, wherein the second display control does not change the movement speed of the pointer image.

* * * * *